(12) United States Patent
Gomez

(10) Patent No.: US 7,820,952 B2
(45) Date of Patent: Oct. 26, 2010

(54) SUPPORTIVE DEVICE FOR MICROWAVE HEATING AND COOKING OF FOOD

(76) Inventor: Julio Antonio Gomez, 59 Robinson Crescent, Runcorn, Queensland 4133 (AU)

( * ) Notice: Subject to any disclaimer, the term of this patent is extended or adjusted under 35 U.S.C. 154(b) by 1023 days.

(21) Appl. No.: 10/595,327

(22) PCT Filed: Oct. 11, 2004

(86) PCT No.: PCT/AU2004/001386

§ 371 (c)(1),
(2), (4) Date: Apr. 9, 2006

(87) PCT Pub. No.: WO2005/032318

PCT Pub. Date: Apr. 14, 2005

(65) Prior Publication Data

US 2007/0272088 A1 Nov. 29, 2007

(30) Foreign Application Priority Data

Oct. 9, 2003 (AU) ............................... 2003905495

(51) Int. Cl.
*H05B 6/80* (2006.01)
*A47G 19/00* (2006.01)
(52) U.S. Cl. ...................... 219/730; 220/574
(58) Field of Classification Search .......... 219/730, 219/725–735; 220/574–575; 345/345–356
See application file for complete search history.

(56) References Cited

U.S. PATENT DOCUMENTS

| 4,074,102 | A | * | 2/1978 | Asen ........................... 219/732 |
| 4,190,757 | A | * | 2/1980 | Turpin et al. ................. 219/730 |
| 4,260,060 | A | * | 4/1981 | Faller .......................... 229/104 |
| 4,283,614 | A | * | 8/1981 | Tanaka et al. ............... 219/681 |
| 4,558,197 | A | * | 12/1985 | Wyatt .......................... 219/732 |
| 4,745,249 | A |   | 5/1988 | Daniels |
| 5,008,508 | A | * | 4/1991 | Skerker et al. .............. 219/732 |
| 5,223,685 | A | * | 6/1993 | DeRienzo, Jr. .............. 219/732 |
| 5,310,977 | A |   | 5/1994 | Stenkamp et al. |
| 5,352,465 | A |   | 10/1994 | Gondek et al. |

(Continued)

FOREIGN PATENT DOCUMENTS

AU 198818208 A1 6/1989

(Continued)

OTHER PUBLICATIONS

Supplementary European Search Report for EP 04 78 9576 issued Dec. 21, 2006; EP 04 78 9576 is the corresponding European application.

(Continued)

*Primary Examiner*—Daniel Robinson
(74) *Attorney, Agent, or Firm*—Ostrager Chong Flaherty & Broitman P.C.

(57) ABSTRACT

A food supportive device (20) for use in microwave heating or cooking of food (10) including a plurality of food contact areas (21) elevated from and substantially integral to a foundation (28) that enables the support of food directly placed on the contact areas, wherein spaces are formed between the elevated food contact areas (21) and the foundation (28) enable the venting or escape of moisture from the food to prevent the food from going soggy.

6 Claims, 18 Drawing Sheets

U.S. PATENT DOCUMENTS

Figure 7:
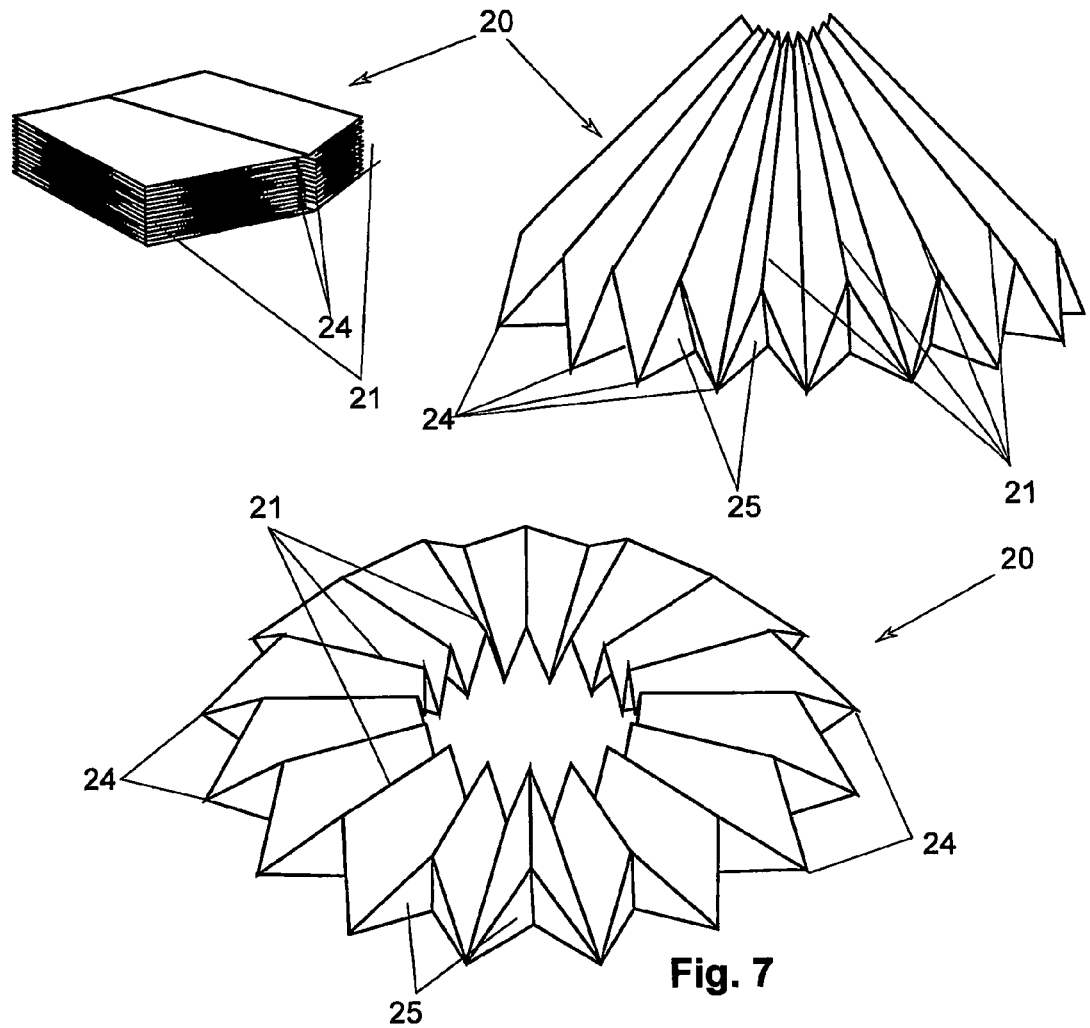

D538,100 S * 3/2007 Dodge .................. D7/388
2002/0020702 A1 * 2/2002 Matsuno et al. ............ 219/734

FOREIGN PATENT DOCUMENTS

| AU | 157242 S | 1/2005 |
| AU | 157382 S | 1/2005 |
| GB | 512024 | 8/1939 |
| JP | 8169478 A | 7/1996 |
| WO | WO 94/16606 A | 8/1994 |
| WO | 01/30657 A3 | 5/2001 |

OTHER PUBLICATIONS

Examination report for EP 04 78 9576 mailed Sep. 2, 2009.

* cited by examiner

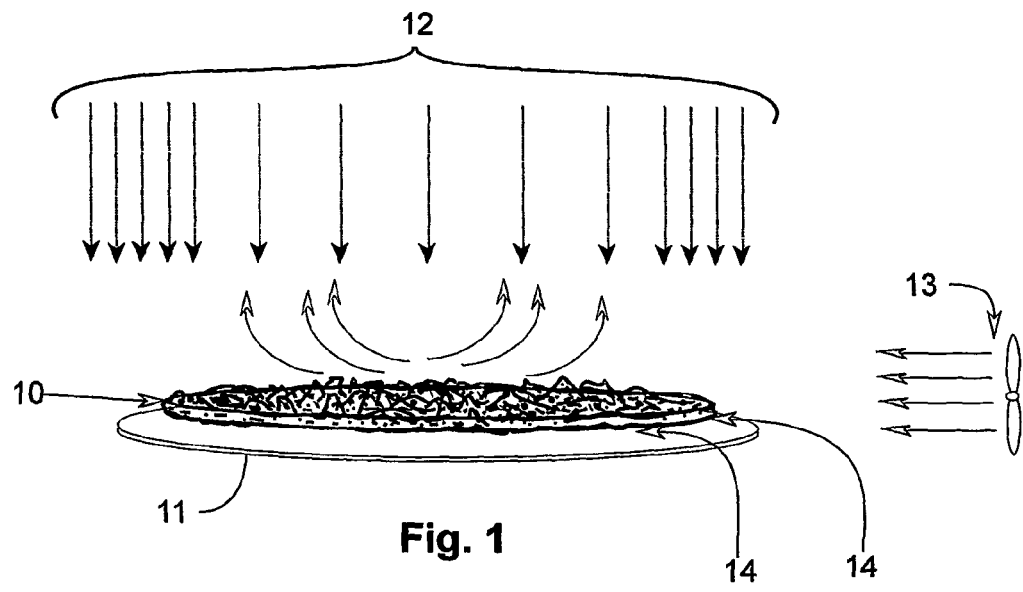
Fig. 1
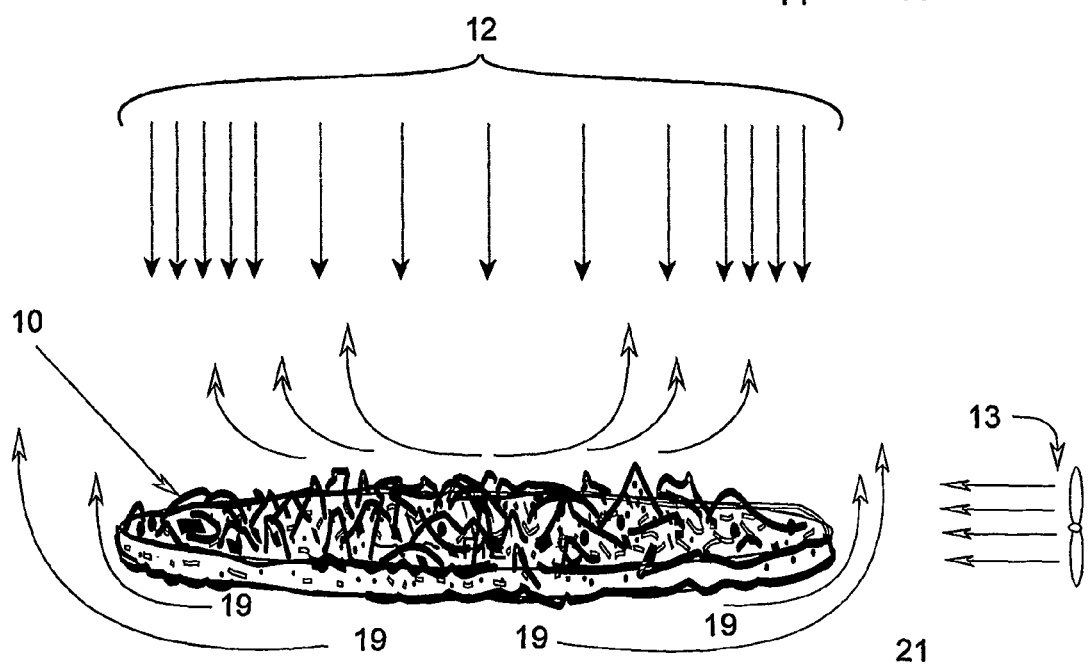
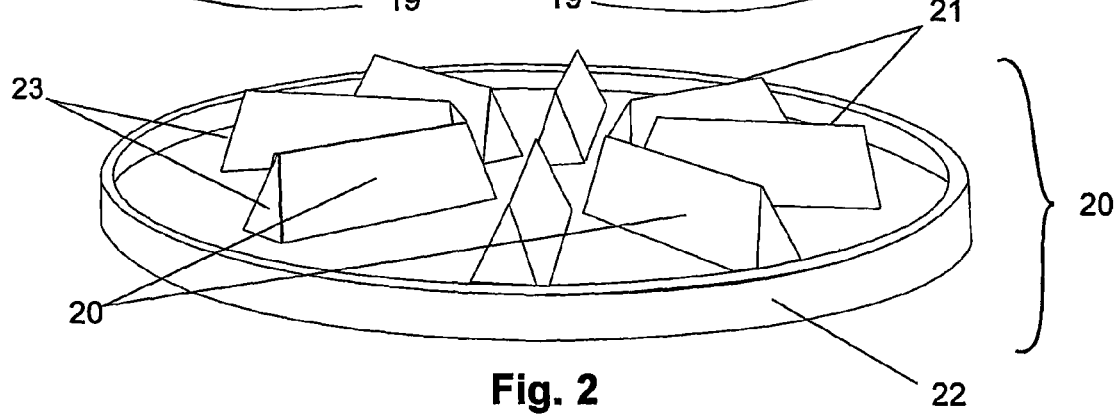
Fig. 2

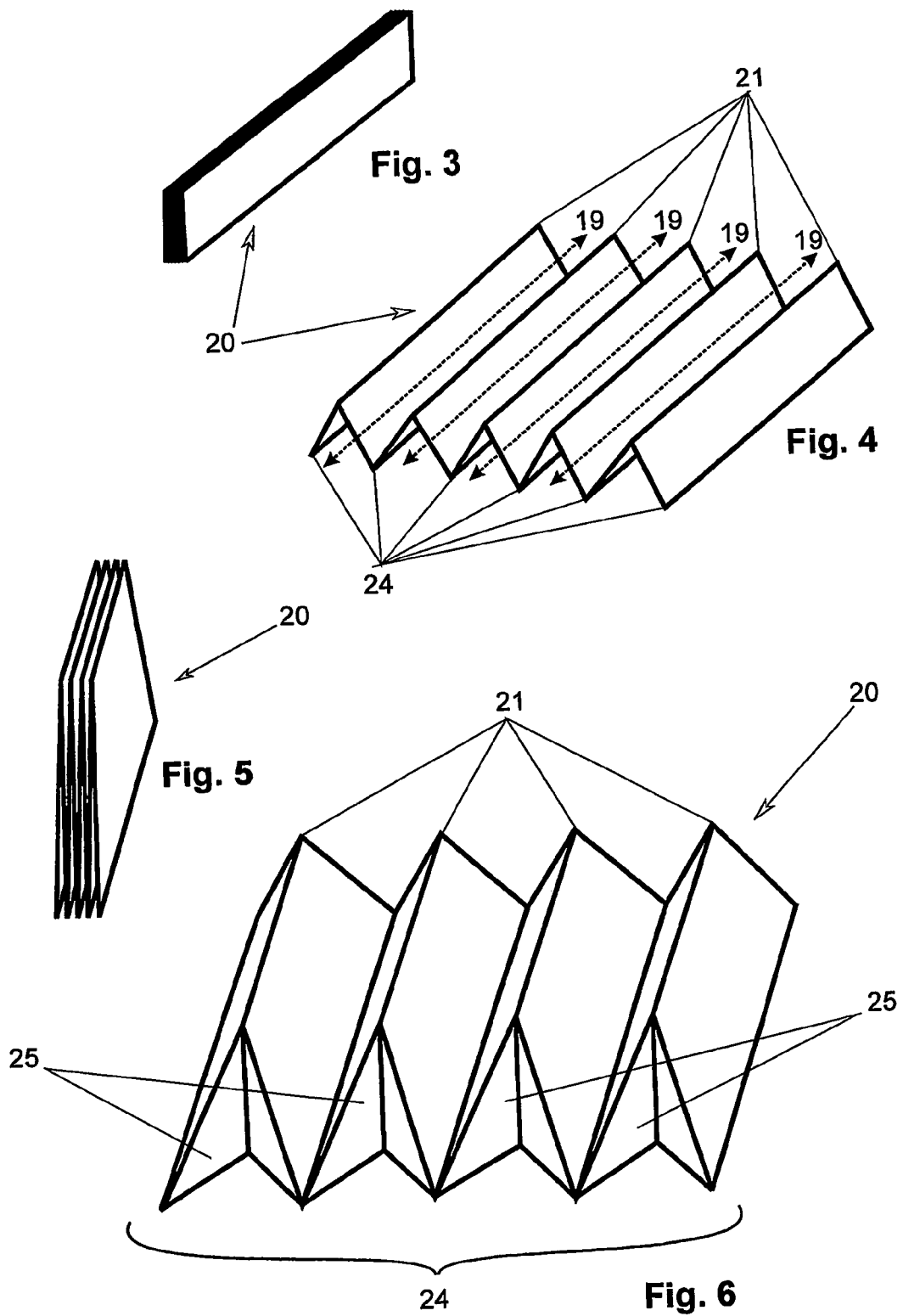

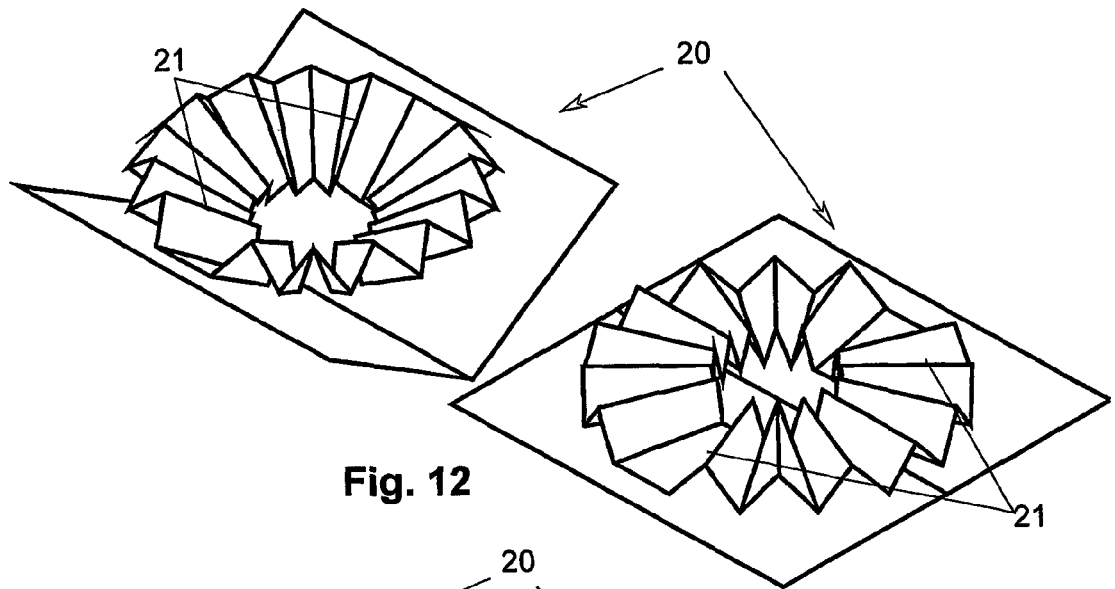
Fig. 12
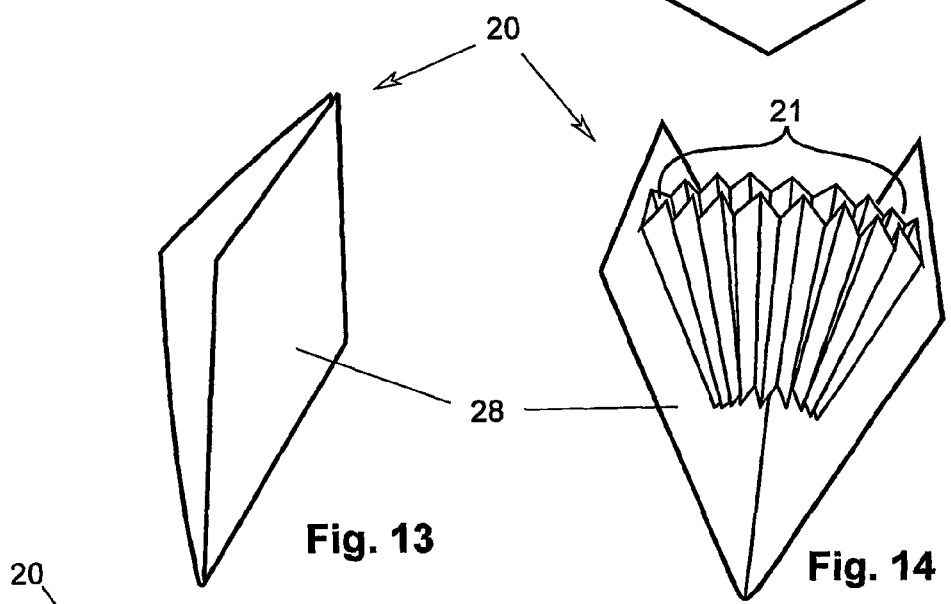
Fig. 13    Fig. 14
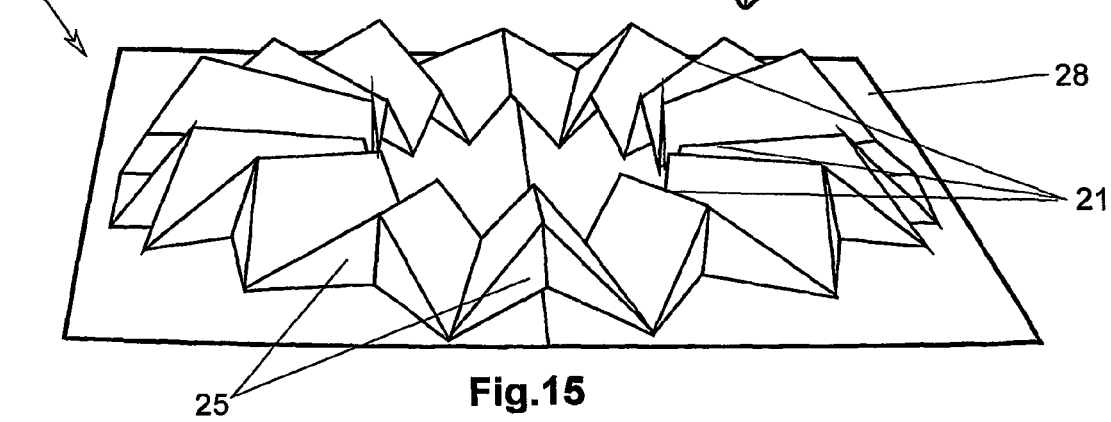
Fig. 15

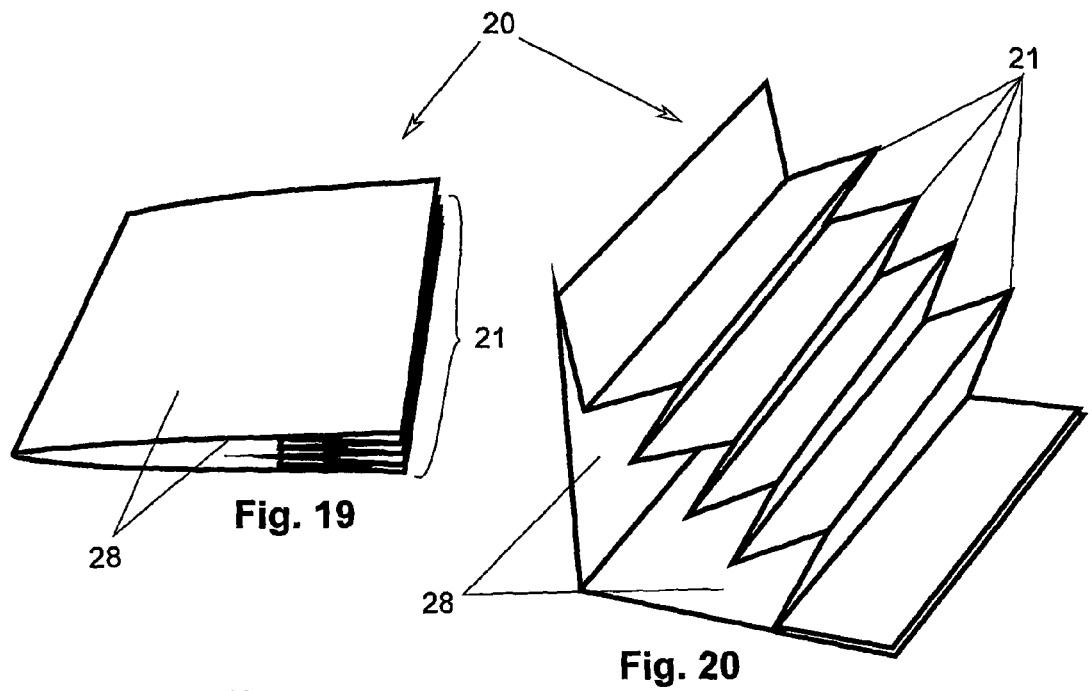
Fig. 19
Fig. 20
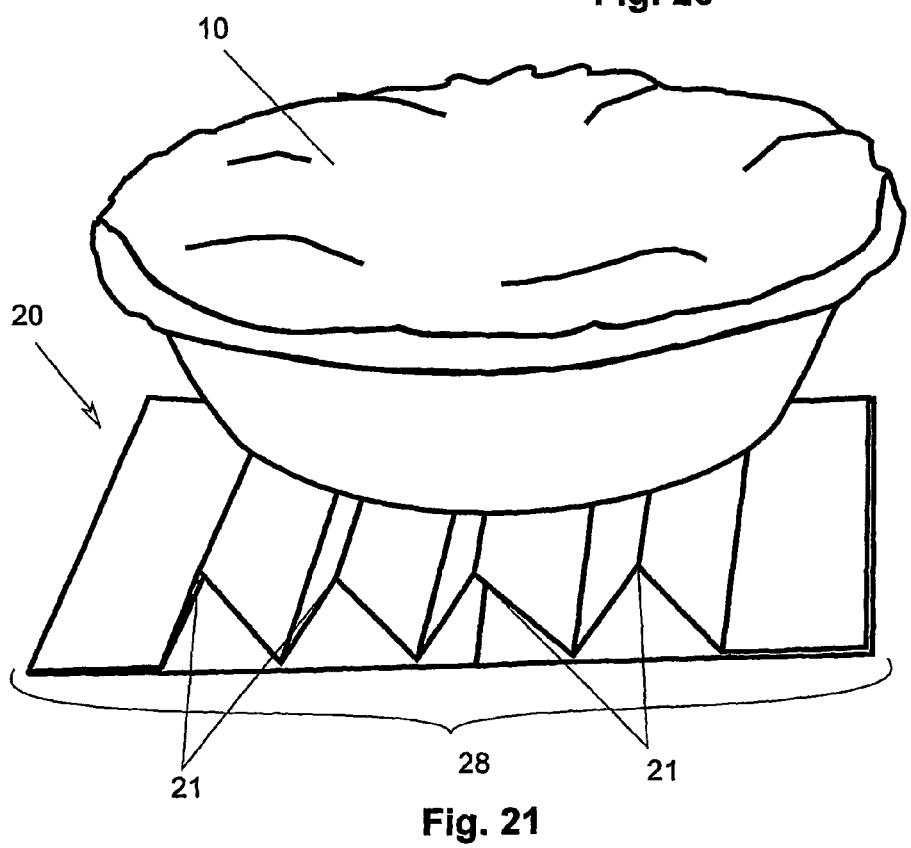
Fig. 21

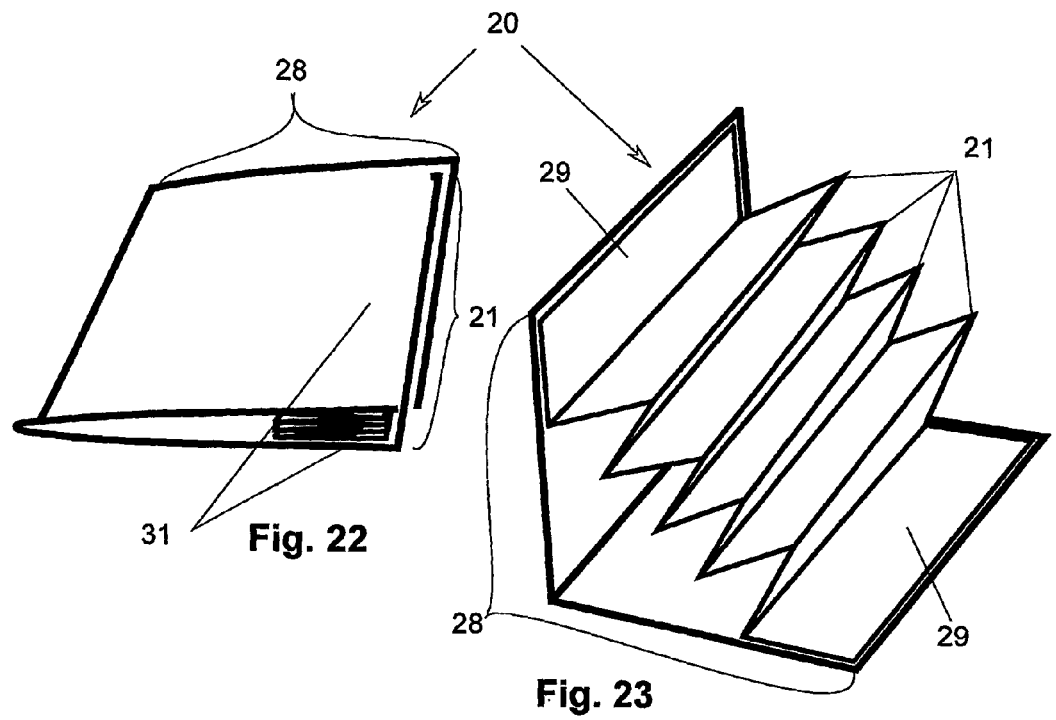
Fig. 22
Fig. 23
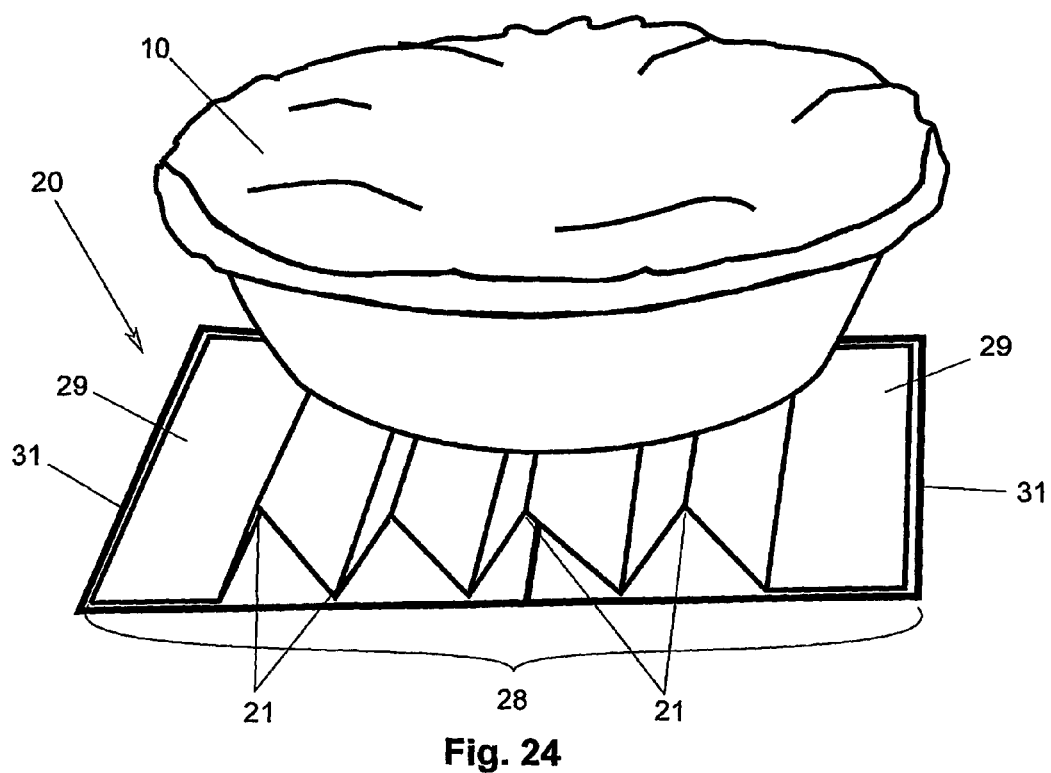
Fig. 24

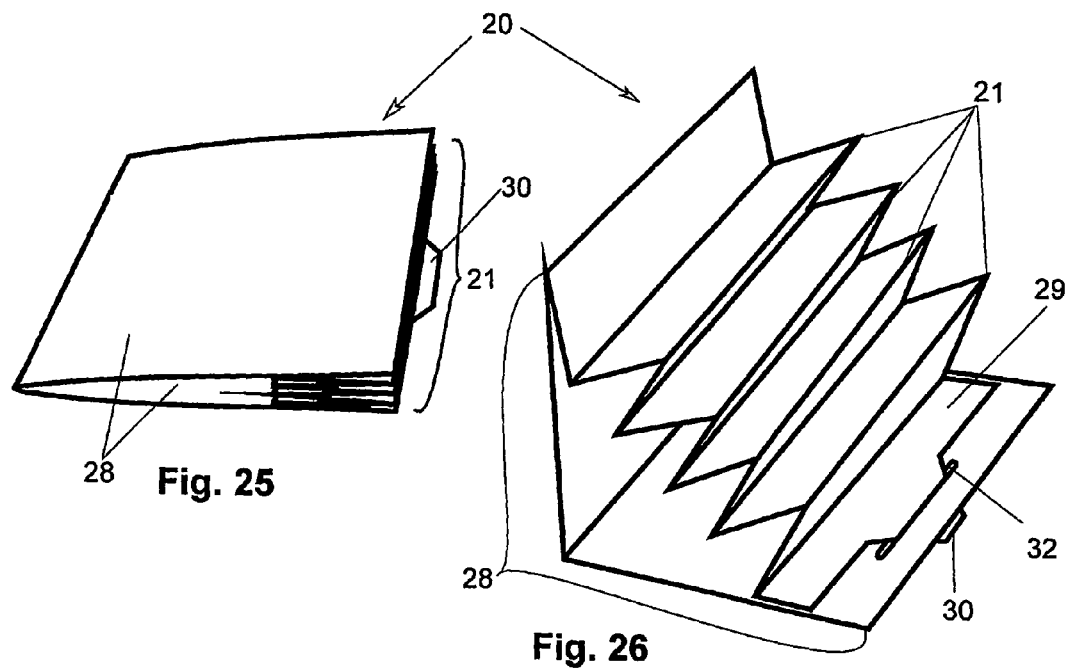
Fig. 25
Fig. 26
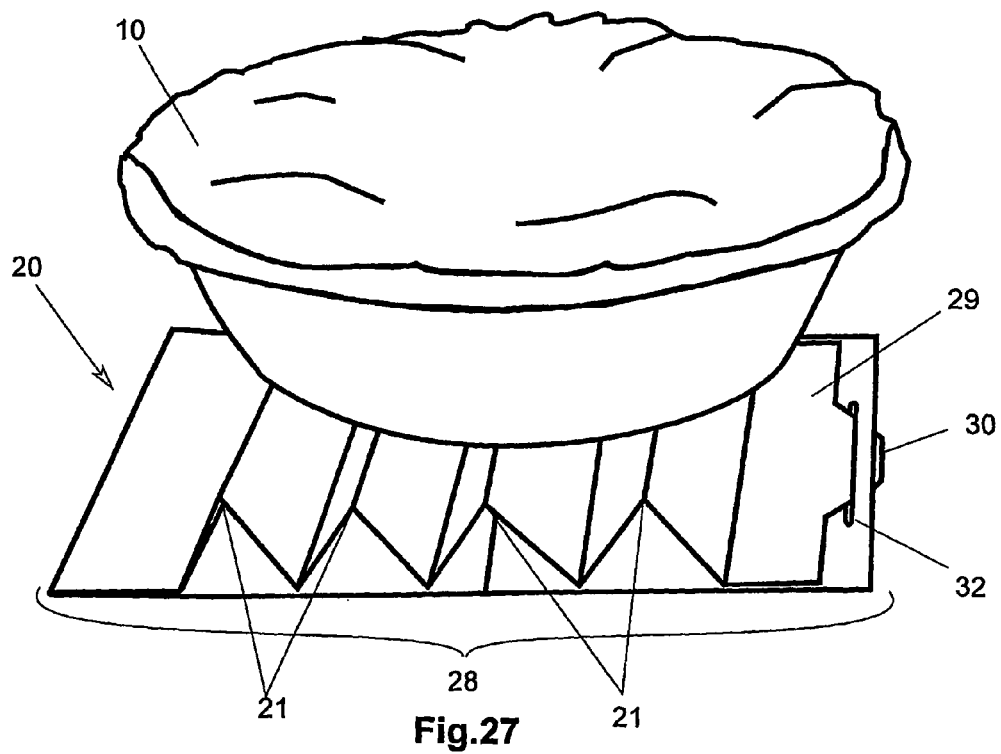
Fig. 27

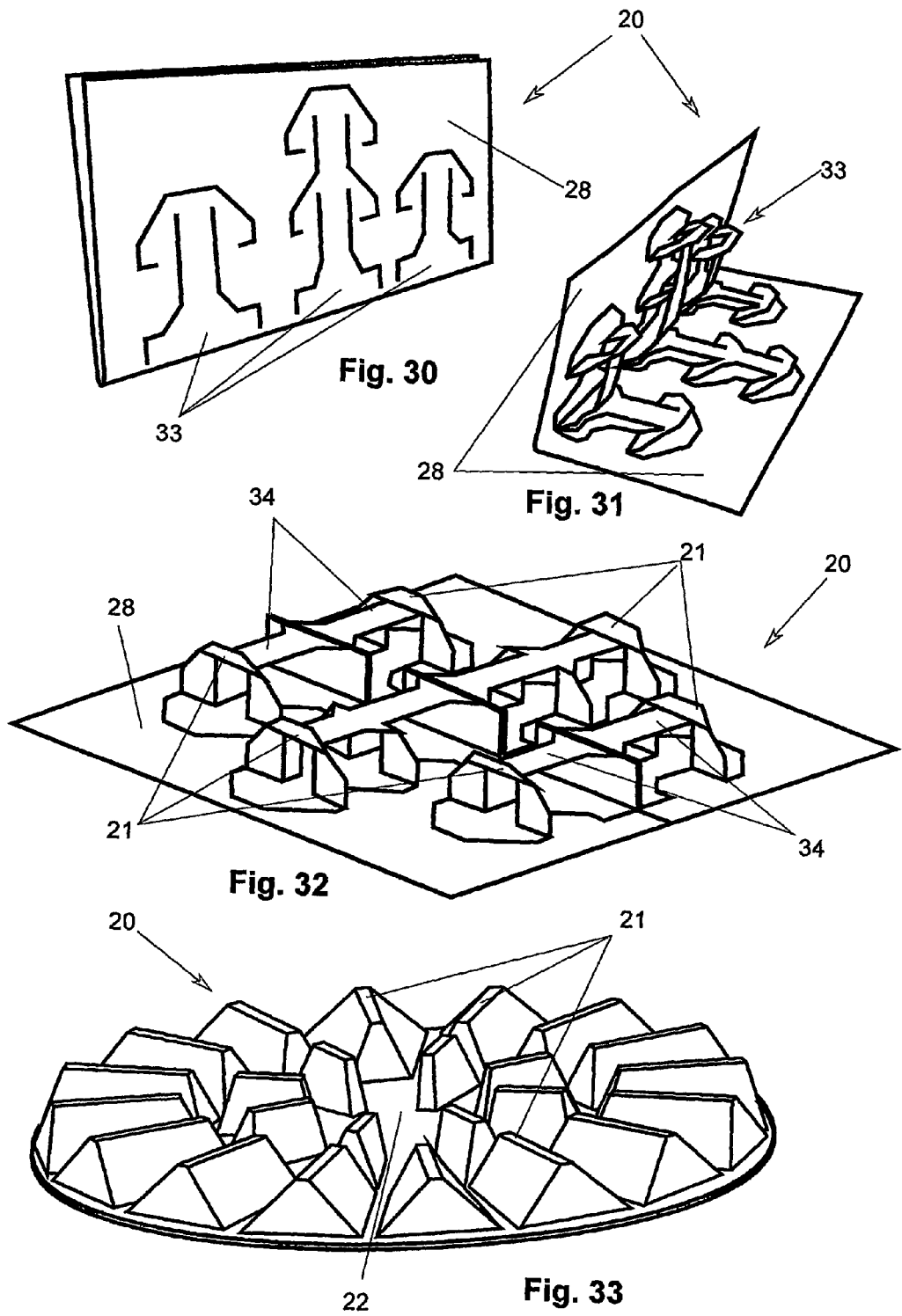

SUPPORTIVE DEVICE FOR MICROWAVE HEATING AND COOKING OF FOOD

The present application is the U.S. national phase application corresponding to and claiming the priority of International Application PCT No. PCT/AU2004/001386, filed Oct. 11, 2004, which claims priority to Australian Application No. 2003905495, filed Oct. 9, 2003; both applications are hereby incorporated by reference.

FIELD OF THE INVENTION

This invention relates to a supportive device, packaging and method utilized in the heating, drying or cooking of foods by microwaves. In particular, the invention may preventing moisture build up in the surface regions of food item during the microwave heating or cooking process.

BACKGROUND OF THE INVENTION

Microwave ovens are popular with almost every household having one, as they provide a relatively inexpensive and a quick way of heating and cooking food. However there is a problem when heating and cooking solid type foods in a microwave, especially those having relatively high moisture content such as pastries and pizzas, as they tend lose their quality and inevitably become soggy.

A microwave oven heats and cooks the food by heating the water in the food product. In traditional microwave heating and cooking methods at home, a user places a food item to be heated or cooked directly onto the microwave turntable plate or other substantially flat dish providing for poor air circulation beneath the food item. This results in a concentration of humidity underneath the food item when being heated or cooked resulting in moisture build up which is absorbed by the food causing it to become overly soggy and unpalatable.

WO94/16606 discloses an apparatus having a base with a number of slots therethrough, a plurality of upwardly extending cylindrical-like food support members and air flow directional means extending below the base for directing air flow from beneath the base to the space between the support members, base and the food. Though this apparatus works well in preventing moisture build up beneath food when being heated in the microwave, it is made from relatively thick materials and has a limited application as a kitchen appliance. It addition, it requires directional means and slots in the base to control the flow of air to circulate around the food.

In contrast, the present applicant has surprisingly developed a simple, convenient, light weight and cost effective food supportive device which may prevent soggy food when heating or cooking with microwaves. In addition, the device enables applications other than a kitchen appliance.

SUMMARY OF THE INVENTION

This invention in one aspect resides in a food supportive device for use in the heating, drying or cooking of food by microwaves including:

a plurality of food contact areas elevated from and substantially integral to a foundation adapted to support food placed directly on the contact areas, wherein spaces are formed between the elevated contact areas and the foundation enabling the escape of moisture from the food being heated, dried or cooked.

This invention relates specifically to food items having a surface that enables direct support of the food on the contact areas whilst still substantially maintaining their shape.

In a preferred embodiment, the spaces between each food contact area and the foundation may form conduits or channels that may assist in the venting or emission of moisture away from the food.

It is to be understood that the foundation may be any basis upon which the elevated food contact areas stand or are supported to enable the bearing of the weight of the food intended to be placed thereon. The foundation may include one or more supports interconnected to each food contact area. Further, the foundation may also include a base interconnected to each of the supports.

Suitably, the food contact areas are sized and shaped to minimize contact with the surface of food when placed thereon whilst still providing sufficient weight bearing load through the foundation. This may provide maximum sized spaces between the contact areas and the foundation potentially enabling the maximum venting or escape of moisture from the food during the microwave heating or cooking process. It should be understood that the size of the food contact areas may be enlarged to be provide spaces that still enable the venting or escape of a sufficient amount moisture to provide a quality heated, dried or cooked food product. A person skilled in the art would be able to determine the minimum and maximum size and shape for the food contact areas and foundation depending on features such as the weight, size and shape of the food item to be placed on the contact areas, size of the contact area required to support the food item, material thickness, stability, load-bearing strength to enable to a quality palatable food item when heated or cooked by microwaves.

Though not a requirement of the present invention, there maybe sufficient on the supportive device to provide advertising or other indica on the supportive device by increasing the size of the food contact areas but still providing adequate spaces for venting or escape of moisture from the food so as not the compromise the quality of a heated or cooked food item when microwaved.

The height of the food contact areas from the foundation may be modified depending of the type of food being heating or cooked. Suitably, the height of the contact areas may be in the region of about 10 mm to about 15 mm. In general, the higher the moisture content of the food the higher the food contact area should be situation from the foundation to provide larger spaces for the venting of the moisture.

The food contact areas may be in positioned in an array where there is a substantially orderly arrangement. Alternatively, the food contact areas may form a pattern. Such arrangements may assist in forming conduits or channels for venting moisture away from the food when microwaved. In a further alternative, the food contact areas may be arranged randomly or irregularly.

In a preferred embodiment, the spaces beneath the food contact areas may allow for the moisture in the food to be expelled isotropically when the food is heated or cooked by microwaves. The size and configuration of the supportive device depends on the type of food intended to be placed thereon and may be circular, square, rectangular, octagonal or any other polygonal shape.

The food supportive device of the invention may be made from any material that is substantially transparent to microwave radiation. For example, the supportive device may be made from polymers, paper, cardboard, paperboard and the like. Depending on the material type, the supportive device may be formed by a suitable moulding process. This may be appropriate for polymers such as PET and for paper products such as papier-mâché.

Alternatively, the supportive device may be foldable or compactable. For example the supportive device may be formed by folding practices, such as is known in the mathematical art of origami. In one embodiment, the supportive device may include a construction of a series of folded concertina-like flutes of thin paper, plastic film or the like, and may be fold-away or compactable so as to permit storage in a compact form.

Further, the compactable forms of the invention may utilize a vertical triangular fold derived from the membrane fold mathematics of origami at the end of each flute. This may provide additional stability to the foundation, as well as improving the load-bearing quality by the edge-loading of the thin membrane via the vertical fold. The device may be produced with or without these rigidifying peripheral folds.

In further embodiments, the supporting device may be also self-erecting such as the mechanism of a pop-up book. For example, the food contact areas and associated supports may emerge from a recessed or concealed position in the foundation. The food contact areas and associated supports may be concertina-like fluted folds or may be cut-outs in the foundation which are elevated when the support device is deployed into operative form.

In a preferred embodiment, the invention is particularly applicable in the microwave heating and cooking of pizzas, parathas, pastries, and other comestibles. Other food products that are suitable for use with the invention as described are muffins, fish fingers, garlic and herb type breads, pies, breads, baked vegetables, baked potatoes, bagels, potato wedges, croissants, battered and crumbed fish, buns, schnitzels, sausage rolls, cakes, pasties and the like.

This invention may improve the quality and texture of a food item when heated or cooked by microwaves in comparison to situation where the invention is not utilized during microwave heating or cooking. In addition, the invention may provide a food product that is equal in quality to those that may be baked in a typical thermal oven. Of course, it is to be understood that a user must still use common sense to microwave the food at appropriate levels and time for the type of food item being heated or cooked. If a user microwaves for too long and/or at the wrong level then they will obtain an unpalatable product no matter what device is used. It should be noted that some pastry items to be cooked or heated in accordance with the invention should be relatively firm and preferably pre-baked. It would be recognized by a person skilled in the art that some pastry food items that are relatively soft are generally not suitable for cooking and heating by microwaves on the device of the invention as they cannot be supported on the food contact areas.

Though not necessary, the food supportive device of the invention may also include a microwave interactive material, such as metallic inclusions capable of converting microwave energy into infrared energy to assist in the browning of the food product.

In addition, the invention as described may be used to dry out food products. When heating or cooking food it is not normally necessary to dry out the food as it would be unpalatable. However, many food items that are deep-frying to produce crispy food require that there is no moisture in the food as it would be detrimental to the deep-frying process. Such food items include potato chip, corn chips, tortillas and the like. Traditionally, these types of food are dried off in a thermal oven before deep-frying. However, by using the device of the invention these foods could be dried more quickly, conveniently and cost-effectively by microwaves as the devices allows the escape and venting of moisture from the food. Once dried the food can then be deep-fried and further processed to produce a commercial product.

In a further aspect this invention resides in a method of heating or cooking food by microwaves including the steps of:

placing a food item directly onto a food supportive device as described above into a microwave oven, and microwaving the food item.

The food supportive device may be utilized as a kitchen appliance where the user can heat or cook food at home in the microwave oven on demand. Alternatively, the food supportive device may be used in packaging, the retail food industry and take away food industry so that when a customer purchases a packaged food item in accordance with the invention it can be conveniently taken home to be heated in a microwave oven in an quick and efficient manner to produce a quality food product.

According, in a still further aspect this invention resides in a food package including:

a food supportive device as described above, and a closure attachable to the supportive device to define a cavity therebetween.

One or more food items may be contained within the cavity. The food supporting device may be a lid to the package. When desired, the food item to be heated or cooked by microwaves the user simply places the food item directly on the lid and microwave it. Alternatively, the food supporting device may be a base for supporting one or more food items, wherein upon removal of the closure from the package the food item and food supportive device base can simply be placed in the microwave oven and microwaved.

In a still further aspect this invention resides in a food package including:

a food supportive device as described above, an open base adapted to receive the supporting device, and a closure attachable to the open base to define a cavity therebetween.

Suitably when the closure is attached to the food supportive device or the open base an air tight seal is effected. For example, there may be a complementary fastening arrangement provided on the confronting surfaces of the cover and either of the food supportive device or the open base, such as a complementary ridge and groove arrangement. Other airtight closure arrangements know in the art may also suitable. The cavity is of a suitable size to enable the location of desired food item intended to be later heated or cooked by microwaves.

The food supportive device may be used in the retail take away industry so that when a customer purchases a packaged food item in accordance with the invention it can be conveniently heated by microwaves in a quick and efficient manner and sold in a convenient serving tray if required to customers.

Alternatively, the food supportive device may be used in the precooking, cooking or drying manufacturing processes.

DETAILED DESCRIPTION OF THE INVENTION

Figure 8:
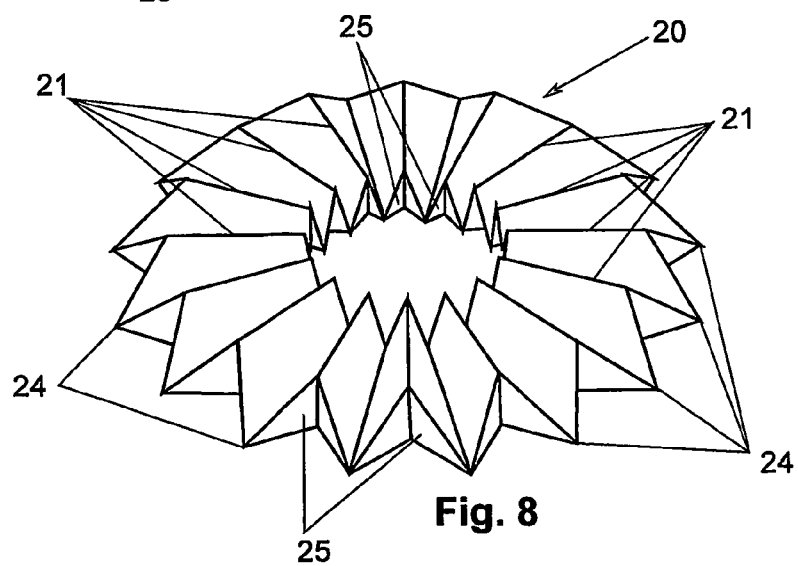
Figure 9:
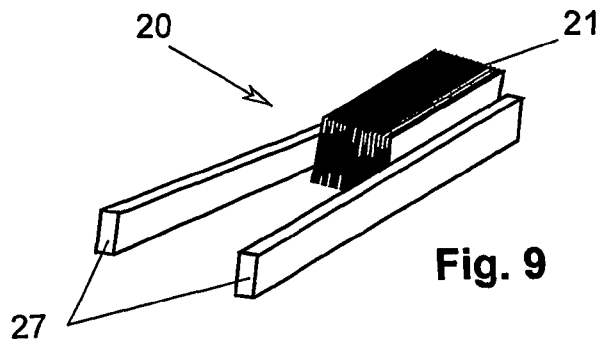
Figure 10:
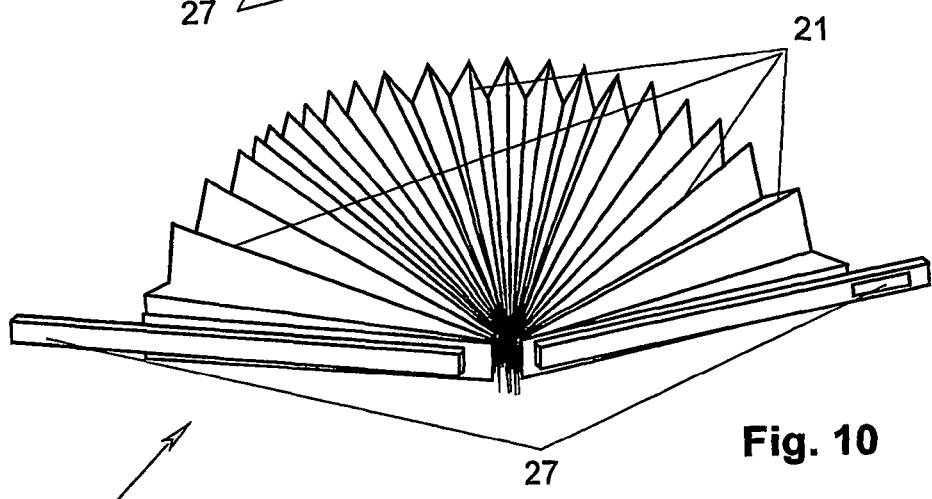
Figure 11:
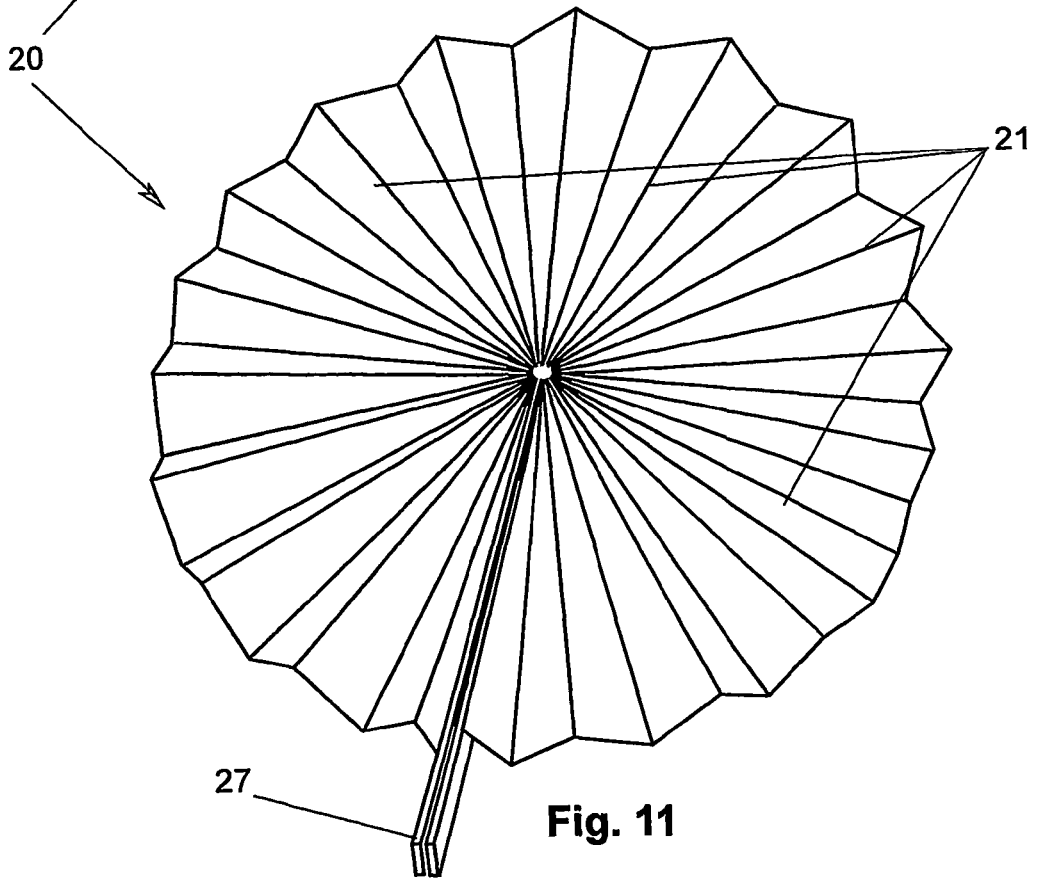
Figure 16:
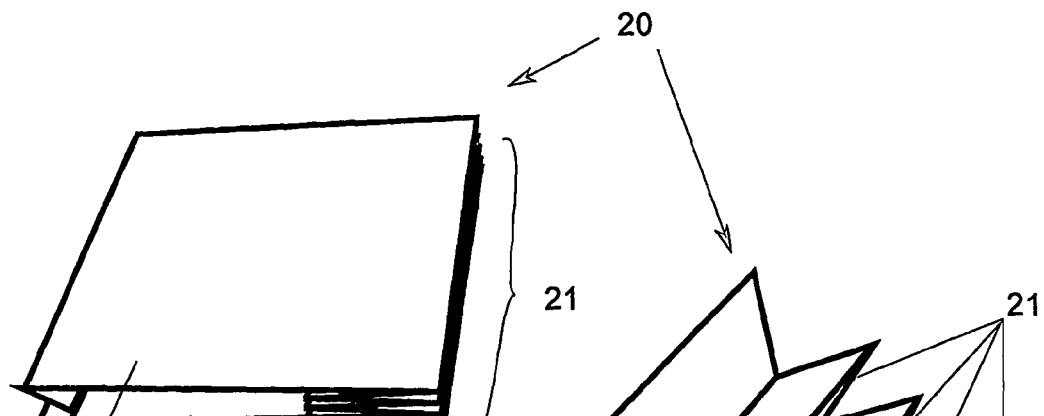
Figure 17:
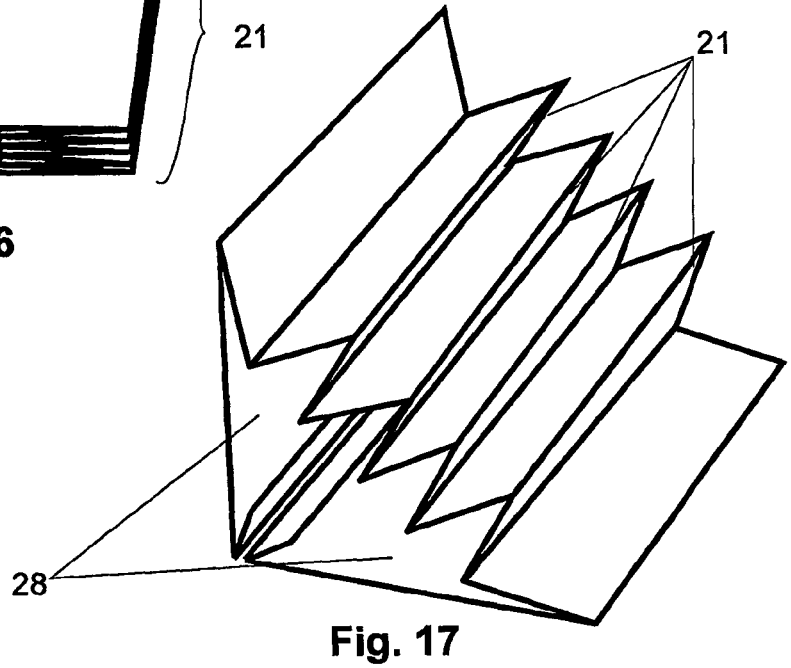
Figure 18:
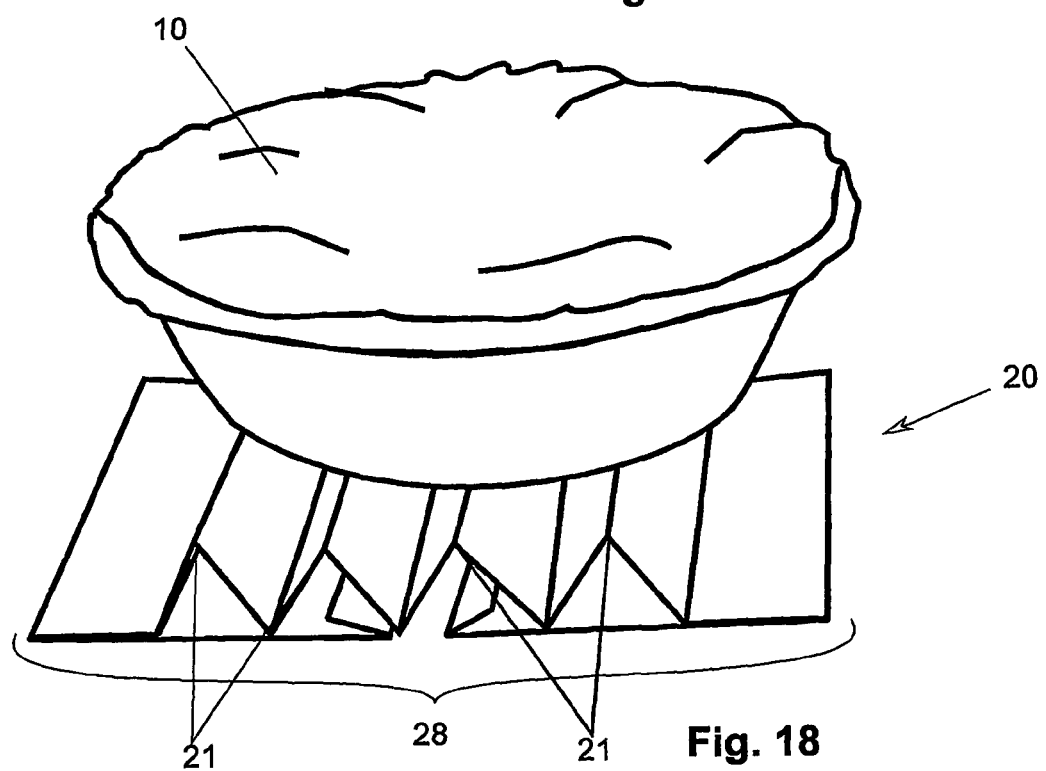
Figure 28:
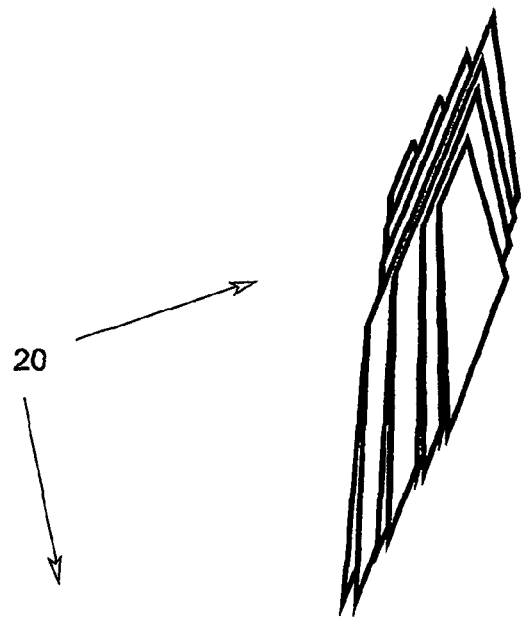
Figure 29:
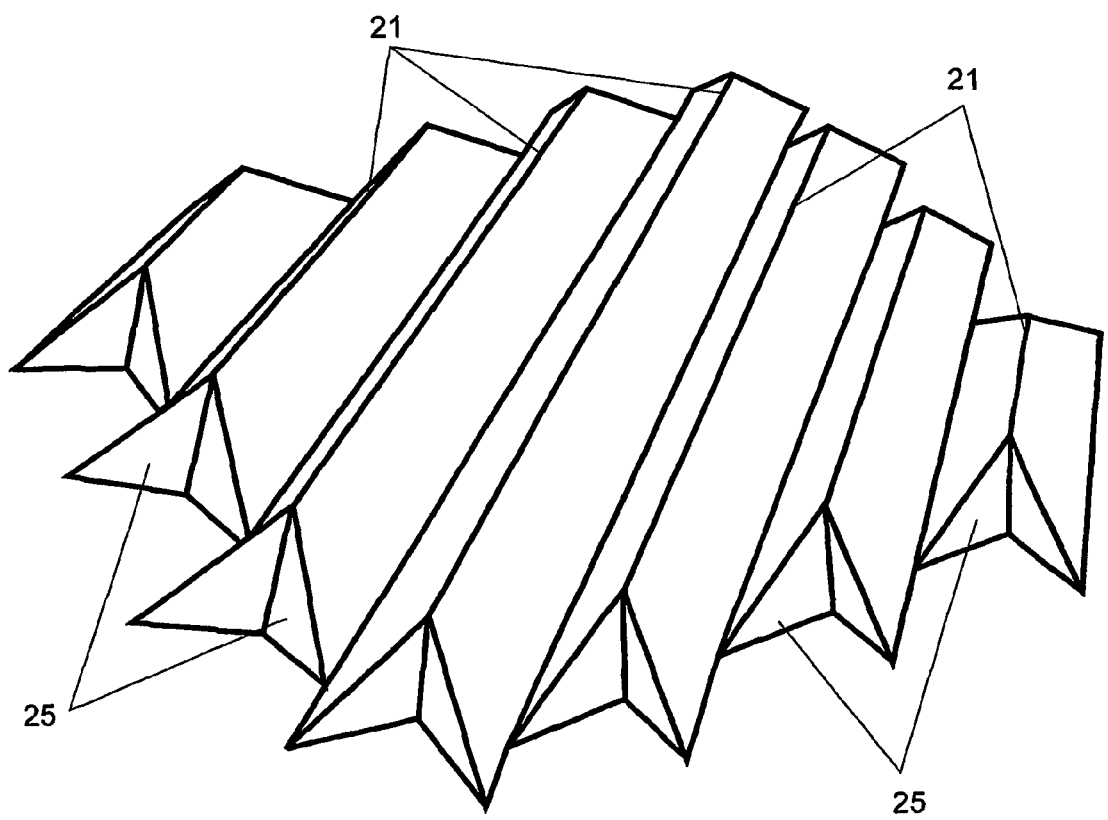
Figure 34:
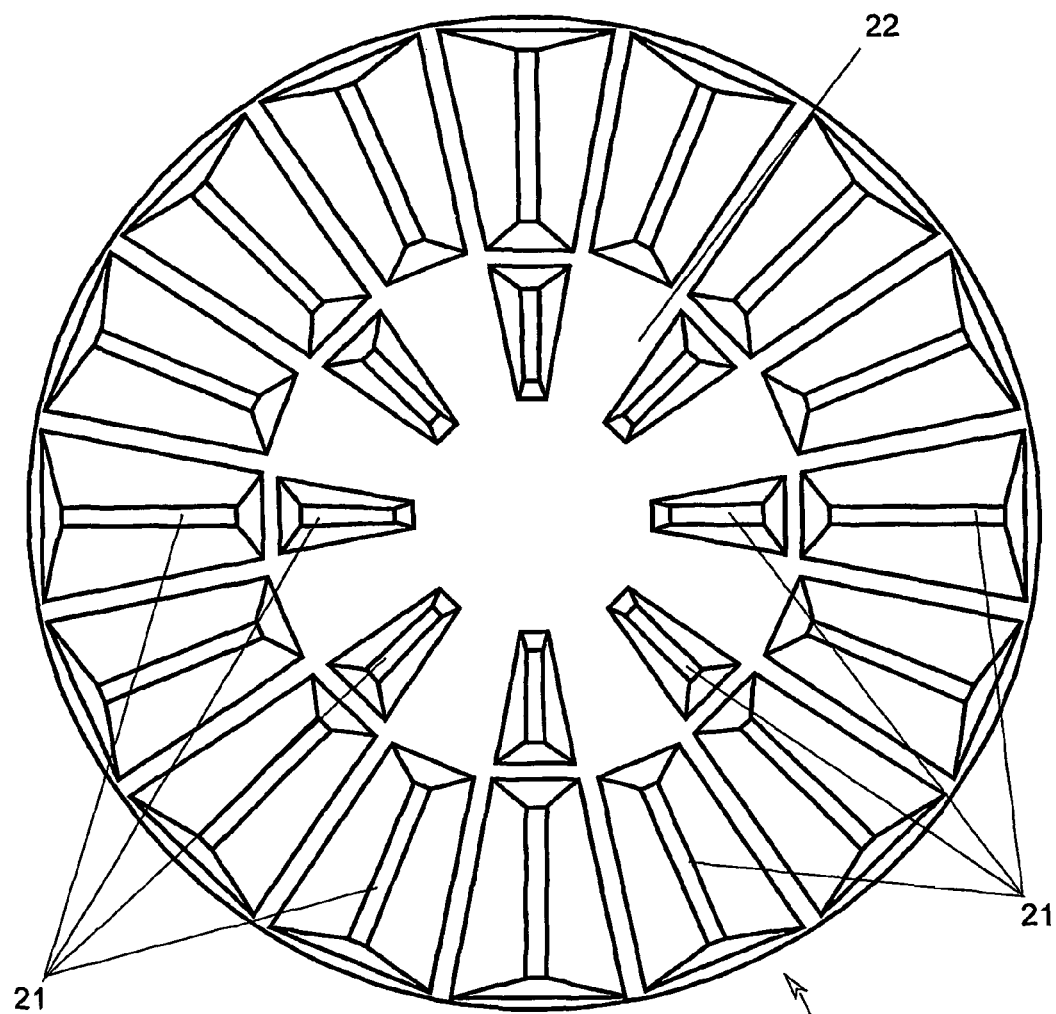
Figure 35:
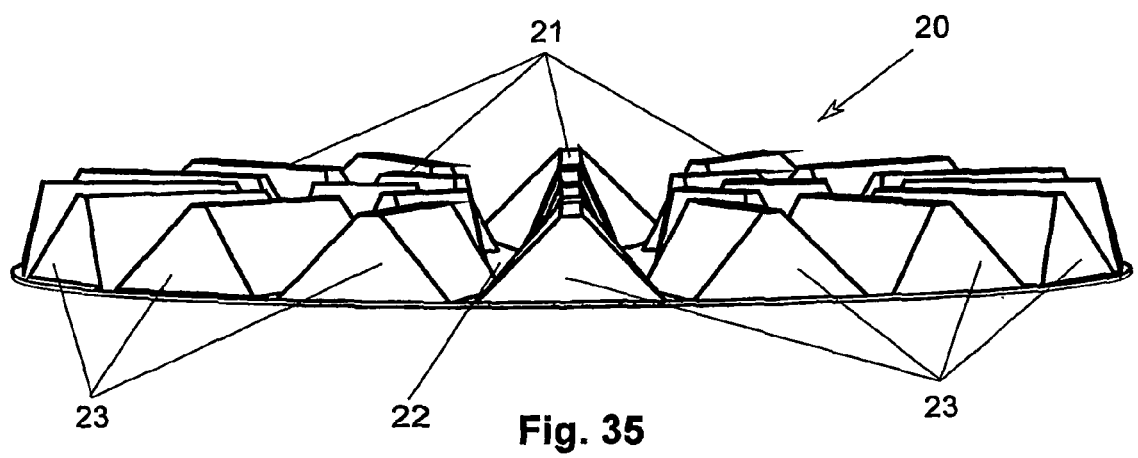
Figure 36:
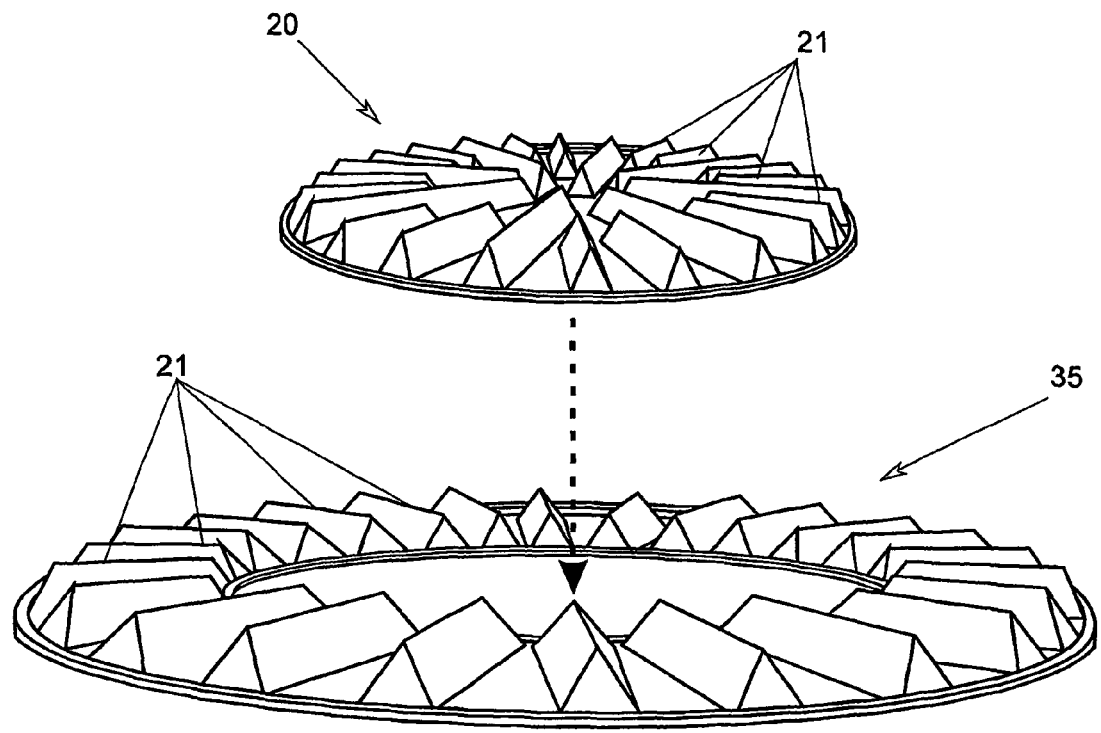
Figure 37:
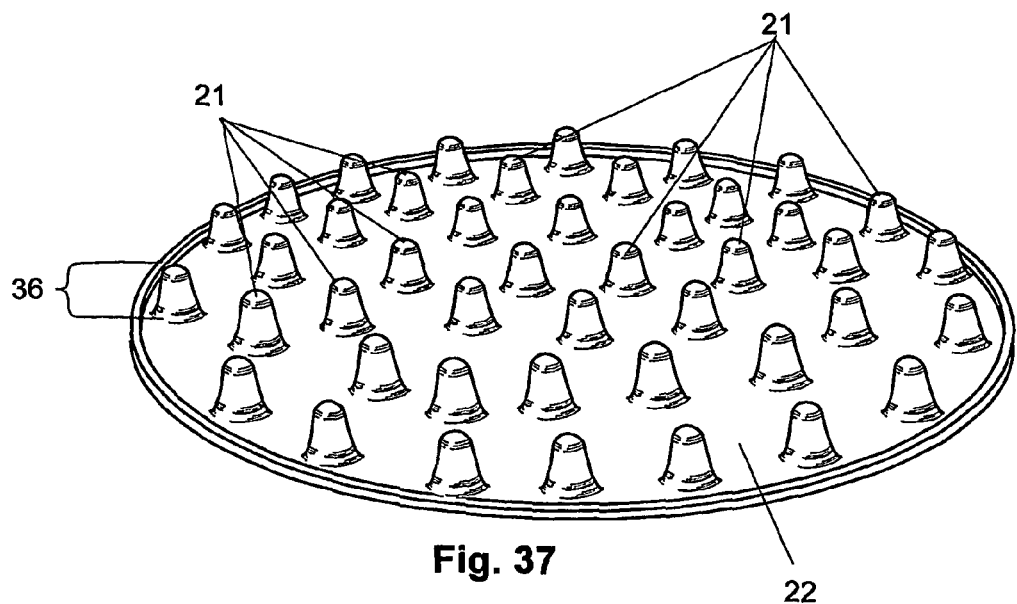
Figure 38:
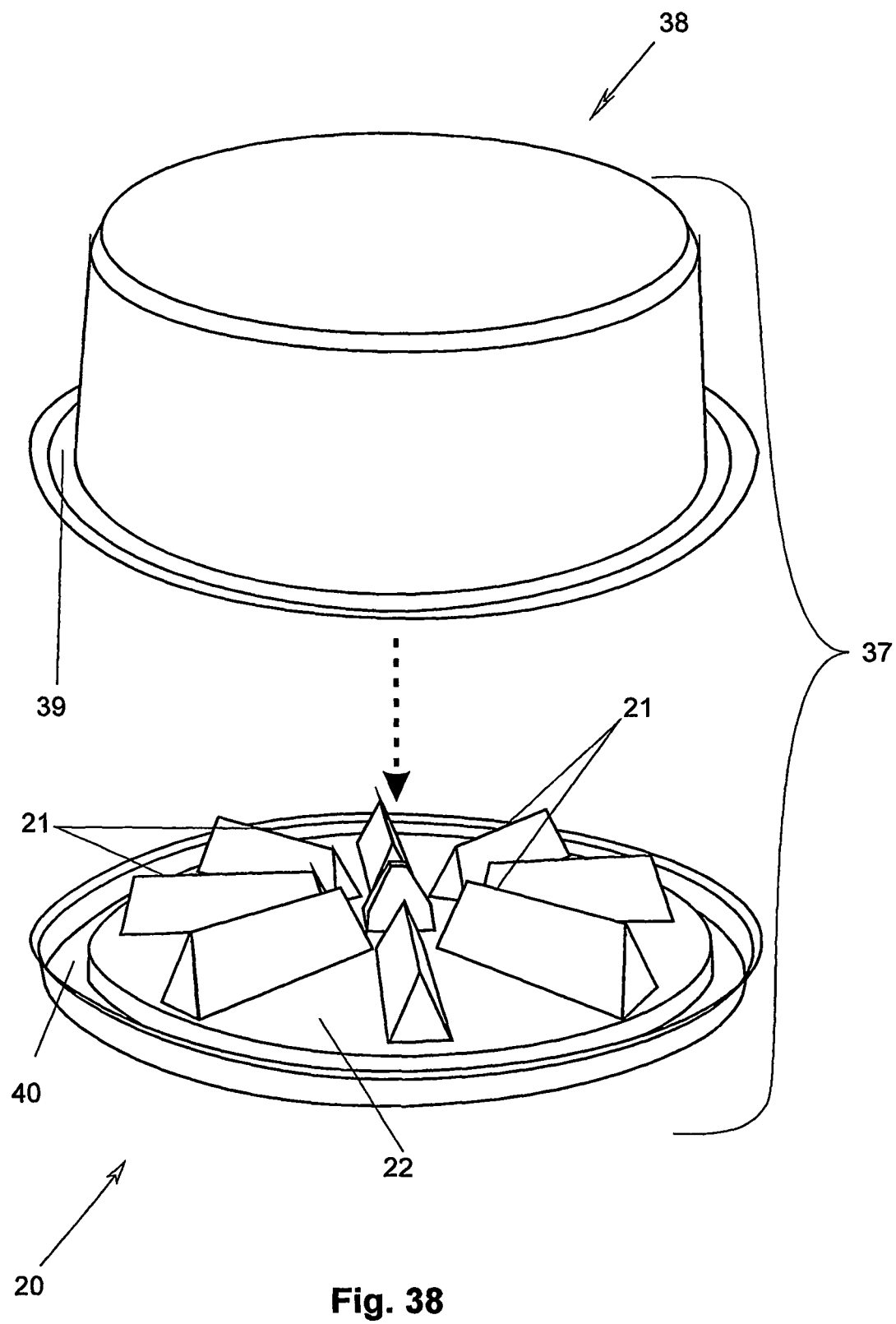
Figure 39:
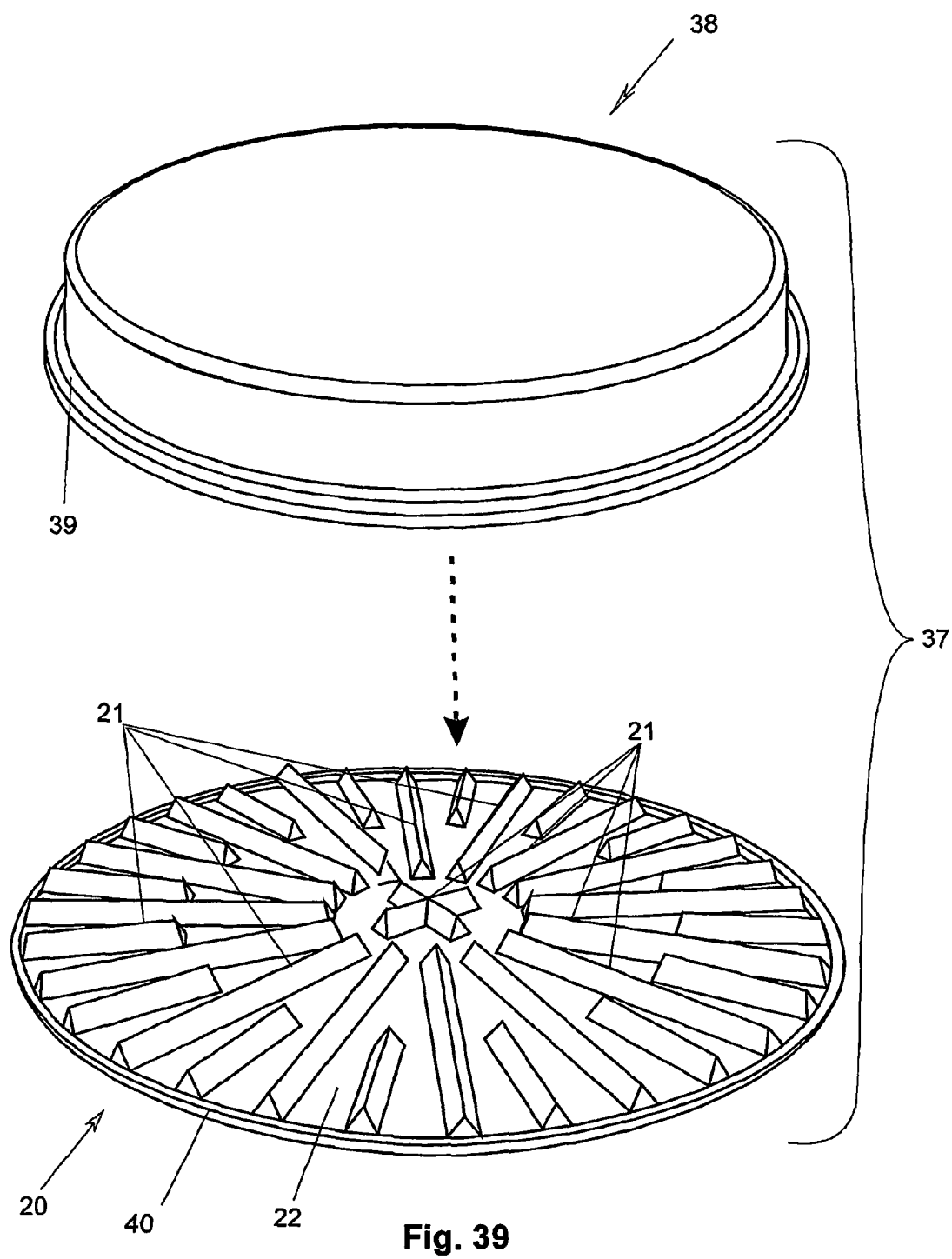
Figure 40:
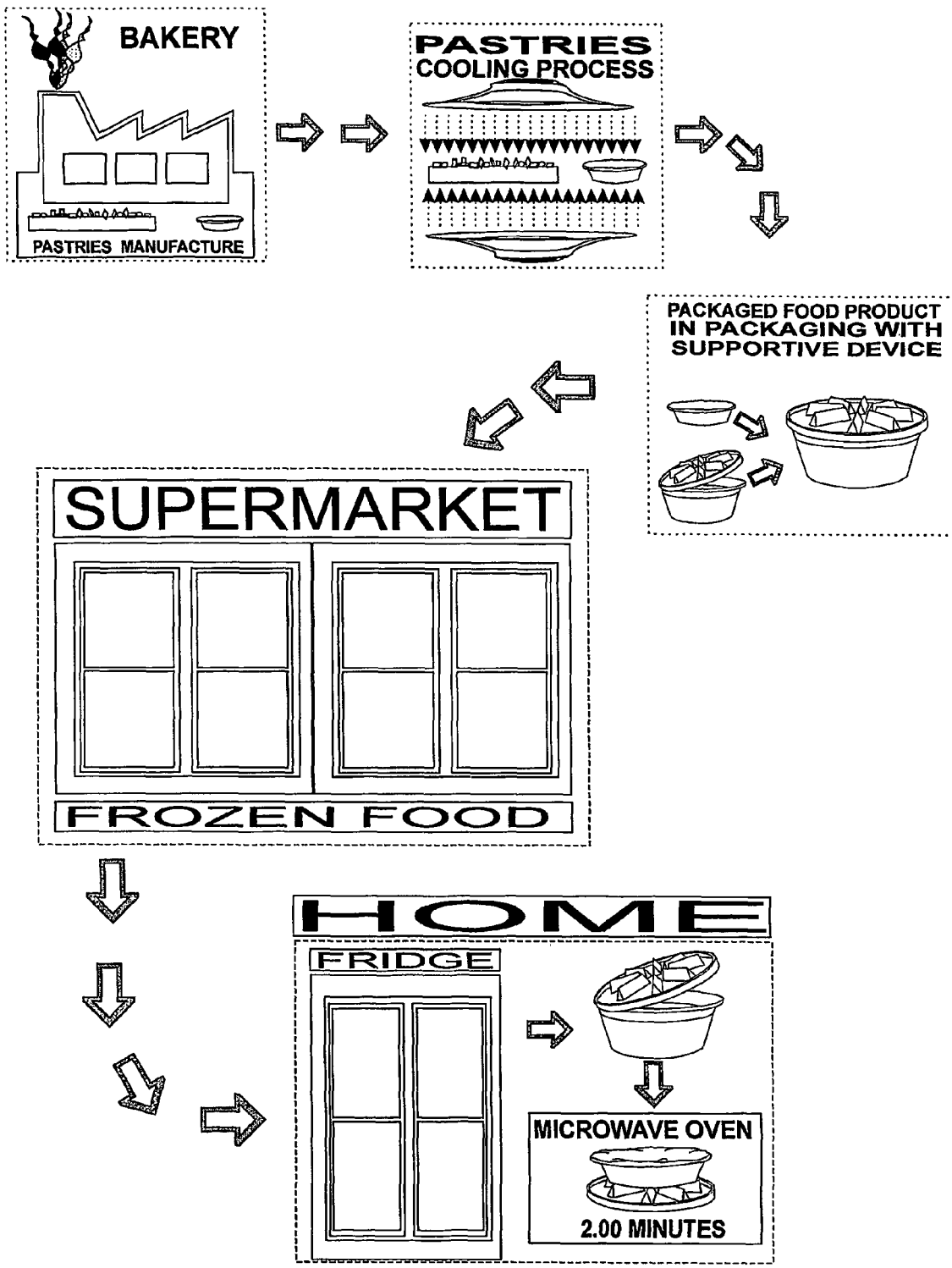
Figure 41:
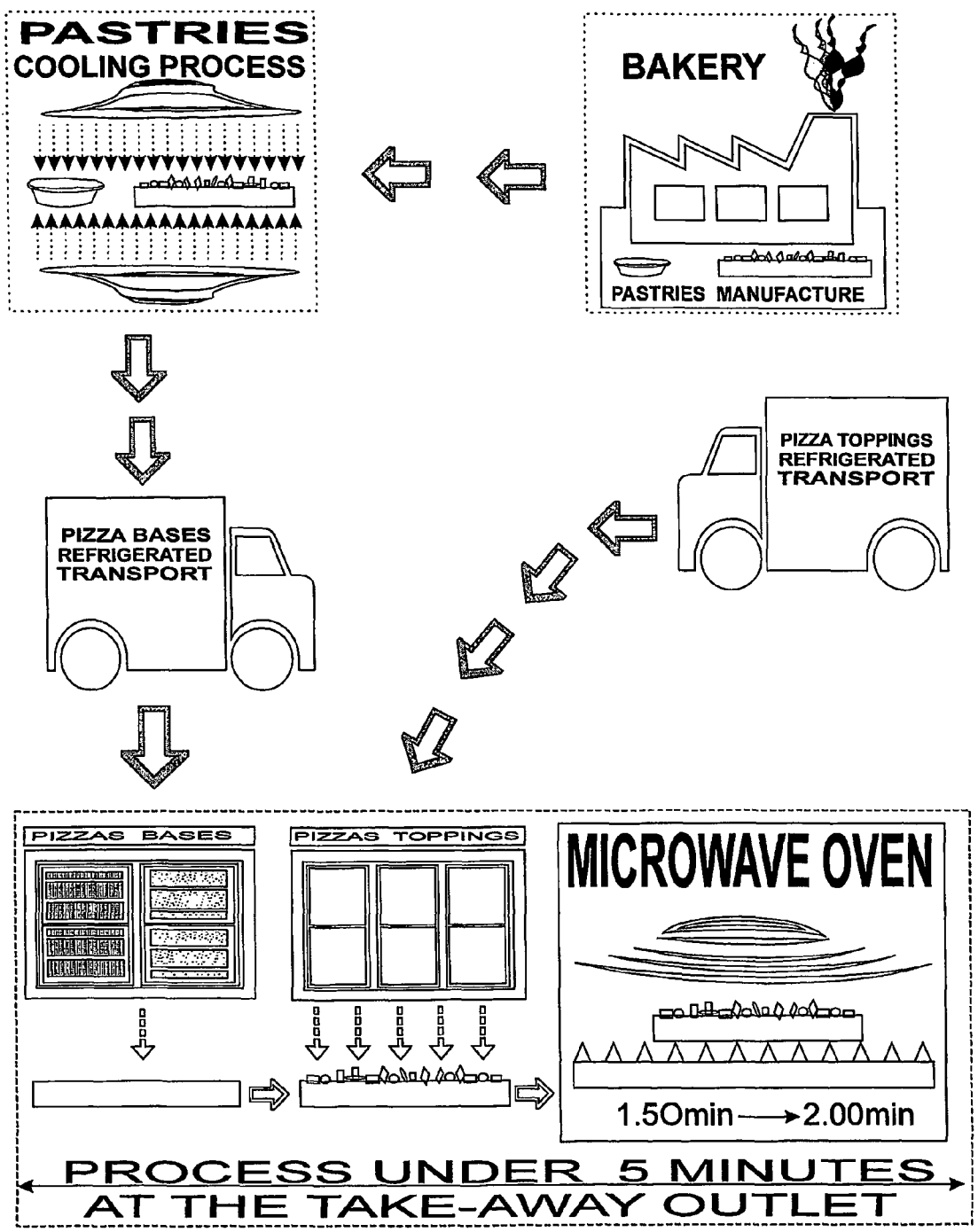
Figure 42:
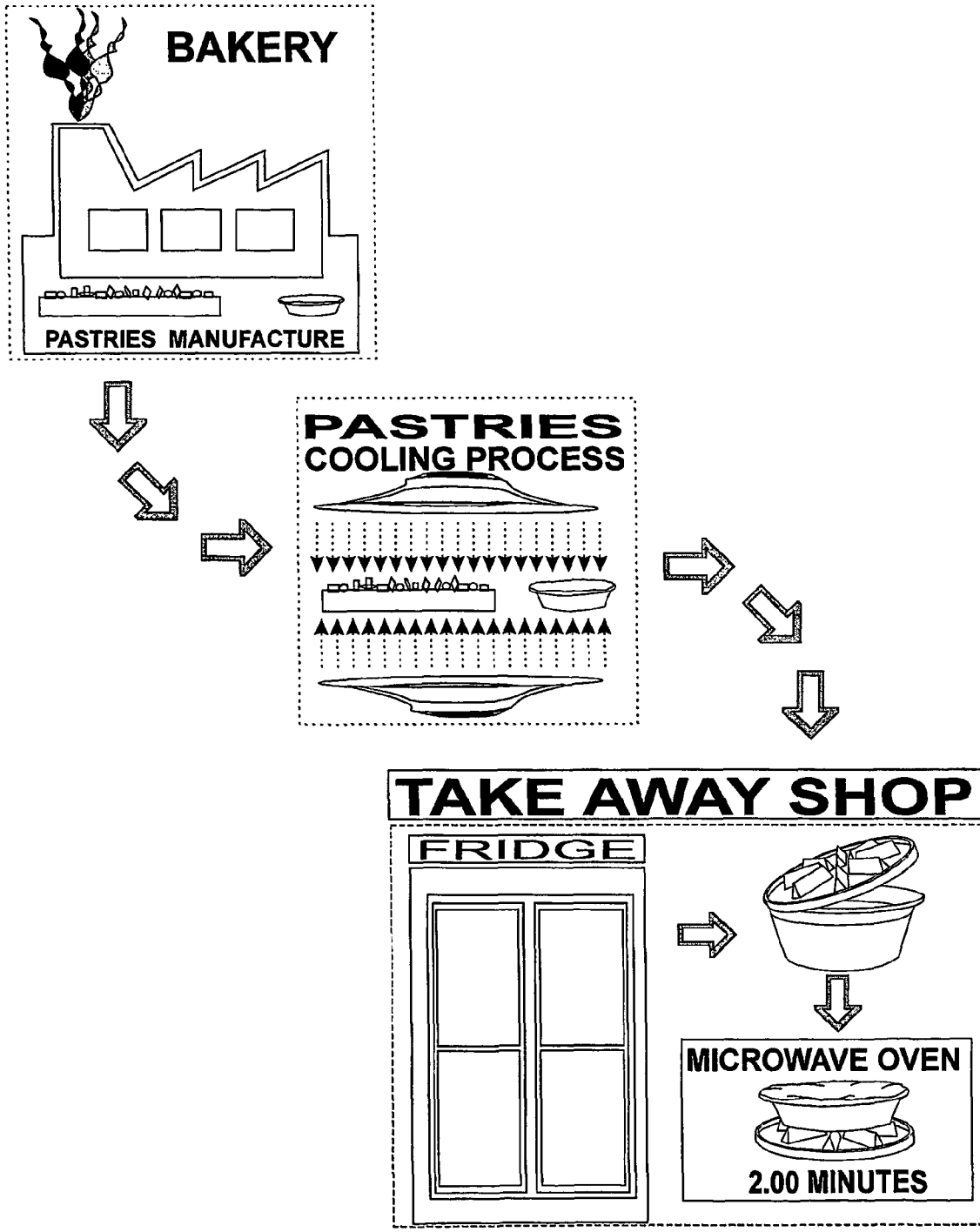

In order that this invention may be more readily understood and put into practical effect, reference will now be made to the accompanying drawings which illustrate preferred embodiments of the invention and wherein:

FIG. 1 illustrates the typical prior art method of microwave heating and cooking of food, FIG. 2 illustrates the mechanism of the food supportive device of the invention as described, FIG. 3 is a laterally deployable parallel fluted supportive device in compact form, FIG. 4 is the laterally deployable parallel fluted supportive device illustrated in FIG. 3 in expanded operative form, FIG. 5 is a laterally deployable fluted supportive device bearing rigidifying folds in compact form, FIG. 6 is the laterally deployable fluted supportive device illustrated in FIG. 5 in expanded operative form, FIG. 7 is a radially deployable fluted supportive device bearing rigidifying folds shown in three arrangements from compactable to operative form, FIG. 8 is a radially deployable fluted supportive device with rigidifying triangular folds at both ends of the flutes, FIG. 9 is a radially deployable fluted supportive device with handles in a compacted form FIG. 10 is the radially deployable fluted supportive device illustrated in FIG. 9 in partially expanded form, FIG. 11 is the radially deployable fluted supportive device illustrated in FIGS. 9 and 10 fully expanded in operative form, FIG. 12 is a self-deploying book-fold radial fluted supportive device, FIG. 13 is a self-deploying book-fold radial fluted supportive device with rigidifying triangle folds in compacted form, FIG. 14 is the self-deploying book-fold radial fluted supportive device with rigidifying triangle folds illustrated in FIG. 13 in partially expanded form, FIG. 15 is the self-deploying book-fold radial fluted supportive device with rigidifying triangle folds illustrated in FIGS. 13 and 14 fully expanded in operative form, FIG. 16 is a laterally deployable book-fold concertina-like fluted supportive device in compacted form, FIG. 17 is the laterally deployable book-fold concertina-like fluted supportive device illustrated FIG. 16 partially expanded, FIG. 18 is a laterally deployable book-fold concertina-like fluted supportive device illustrated in FIGS. 16 and 17 fully expanded in operating form, FIG. 19 is a laterally deployable book-fold concertina-like fluted supportive device with secured ends in compacted form, FIG. 20 is the laterally deployable book-fold concertina-like fluted supportive device with secured ends illustrated in FIG. 19 in partially expanded form, FIG. 21 is the laterally deployable book-fold concertina-like fluted supportive device with secured ends illustrated in FIGS. 19 and 20 in fully expanded operative form, FIG. 22 is a laterally deployable book-fold concertina-like fluted supportive device with backing in compacted form, FIG. 23 is the laterally deployable book-fold concertina-like fluted supportive device with backing illustrated in FIG. 22 in partially expanded form, FIG. 24 is the laterally deployable book-fold concertina-like fluted supportive device with backing illustrated in FIGS. 22 and 23 in fully expanded operative form, FIG. 25 is a laterally deployable book-fold concertina-like fluted supportive device with a locking tab in compacted form, FIG. 26 is the laterally deployable book-fold concertina-like fluted supportive device with a locking tab illustrated in FIG. 25 in partially expanded form, FIG. 27 is the laterally deployable book-fold concertina-like fluted supportive device with a locking tab illustrated in FIGS. 25 and 26 in fully expanded operative form, FIG. 28 is a laterally deployable concertina-like fluted supportive device with differing sized flutes with rigidifying triangle folds in compacted form, FIG. 29 is the laterally deployable concertina-like fluted supportive device with differing sized flutes with rigidifying triangle folds illustrated in FIG. 28 in fully expanded operative form, FIG. 30 is a self-deploying book-fold supportive device with self-erecting cut-outs in compacted form, FIG. 31 is the self-deploying book-fold supportive device with self-erecting cut-outs illustrated in FIG. 30 in partially expanded form, FIG. 32 is the self-deploying book-fold supportive device with self-erecting cut-outs illustrated in FIGS. 30 and 31 in fully expanded operative form, FIG. 33 is a perspective view of a rigid form of the supportive device in accordance with the invention, FIG. 34 is a top plan view of the rigid form of the supportive device illustrated in FIG. 33, FIG. 35 is a side view of the rigid form of the supportive device illustrated in FIGS. 33 and 34, FIG. 36 is a perspective view of a expander ring for increasing the size of a supportive device in accordance with the invention, FIG. 37 is a perspective view of a second embodiment of a rigid form of a supportive device in accordance with the invention, FIG. 38 is packaging incorporating a supportive device in accordance with the invention, FIG. 39 is a second embodiment of packaging incorporating a supportive device in accordance with the invention, FIG. 40 illustrates the process of the utilizing packaging incorporating a supportive device of the invention in the retail industry, FIG. 41 illustrates the process of the utilizing packaging incorporating a supportive device of the invention in the pizza takeaway industry, and FIG. 42 illustrates the process of the utilizing packaging incorporating a supportive device of the invention in the pastry takeaway industry.

It should be understood that the terms such as "upper", "lower", "base", "top", "underneath", "bottom", "underlying", "outside", "end", "inner", etc. refer to the orientation or configuration of the invention when used according to the illustrations and to assist in indicating points of reference when viewing the accompanying figures. It is to be understood that these terms do not necessarily limit the present invention to any specific orientation or configuration of the invention.

Example 1

The problem with heating solid-type foods in a microwave oven is best illustrated in FIG. 1 where a food item 10, in this case a pizza, is resting directly on a substantially flat microwave turntable plate or dish 11, which the traditional method of heating food in a microwave oven. The plate 11 remains cold during the microwave procedure as it is transparent, while the food 10 is heated by the microwave flux 12 and the air is circulated by a fan 13. The microwave flux 13 is uneven creating so-called "hot" and "cold" spots promoting a natural air circulation permitting escape of moisture from the upper surface of the food item 10. However, there is a lack of air flow under the food item 10 resulting in a concentration of humidity 14 due to the difference in temperature between the food 10 being heated and the cold dish 11. This creates moisture under the lower surface of the food item which is absorbed creating a soggy food item 10.

FIG. 2 illustrates how the invention overcomes this problem of moisture build up underneath a microwave food item producing soggy food by utilizing a food supportive device 20 in accordance with the invention. The supportive device 20 includes a plurality of food contact areas 21 arranged in an array and elevated from a base 22 via supports 23 forming a foundation for the food contact areas 21. The size of the food contact areas 22 are minimized to reduce the contact area between the hot and cold surfaces. When a food item 10 is placed on the food contact area 21 spaces are formed beneath the food item 10 and the base 22 enabling drying air to flow underneath the food and permitting the escape of moisture from the lower surfaces of the food 10 preventing the accumulation of condensate in the microwave oven In this particular embodiment, the moisture is expelled isometrically due to the arrangement of the food contact areas 21 in an array. In a preferred embodiment, the spaces are in the form of conduits or channels 19 which assist in the venting or emission moisture.

Food, such as pastries, range from low moisture and fat content to high moisture and fat content. A person skilled in the art would understand that the balance of moisture and fat content requires different levels of heat and cooking time.

Low humidity and fat can be re-heated fast maximum heat short time.

Low humidity and high fat content the heat need to decrease then long re-heating time at low heat.

High humidity low and high fat low heat and re-heating time longer time.

As such, to obtain best results appropriate microwave heating or cooking procedures should still be implemented in accordance with the food type It should also be noted that the microwave flux will not improve or be detriment to food products being re-heated. As such, food with high moisture content will be soft and food with low moisture content will be crispy. The height of the elevated food contact areas 21 optimally ranges in height from about 10 mm for low moisture foods to about 15 mm for high moisture foods The present invention is best utilized to re-heat previously baked cool or frozen pastries where the bottom of the food is relatively firm. Some unbaked food items which have a soft bottom may not be suitable as they cannot be supported on the food contact areas 22 and may crack.

Example 2

FIGS. 3 to 6 show laterally deployable fluted supportive devices 20 in accordance with the invention as described. The devices 20 are made by folding paper to form parallel flutes resulting in upper folded edges forming food contact areas 22 and the lower folded edges 24 forming the basis of the foundation with interconnecting supporting regions therebetween. FIGS. 5 and 6 include triangular rigidifying folds 25 formed by origami techniques which may provide additional weight bearing strength to the foundation.

Surprisingly, the folding techniques of these devices 20 provide significant load-bearing qualities even though it may only be made of paper of 80 gms weight. Of course, it could be made of thin plastics, cardboard or the like. The fluted folds also enable the devices 20 to be compactable as illustrated in FIGS. 3 and 5 for easy storage.

In use, food is placed on the upper folded edges or the food contact areas 21 in a microwave oven. Spaces are formed between each fold or flute when enables the circulation of air beneath the food and escape of any moisture.

Example 3

FIGS. 7 to 8 show radially deployed fluted supportive devices 20 in accordance with the invention as described. Essentially, these embodiments are made from parallel folded flutes supportive devices such as those shown in FIGS. 4 and 6 where the opposed ends of the flutes are constrained or adhered together, such as with glue or other adhesive, to produce angular corrugated fluting when deployed. FIG. 7 has triangular rigidifying folds 25 at outer end of the bundles and FIG. 8 has triangular rigidifying folds at both ends of the bundle.

In deployment, the triangular end-folds may be radially spread, so as to be opened like a fan, and on completion of a 360° turn, the meeting flutes are secured such that the spread flutes will not re-part.

FIGS. 9 to 11 illustrate an alternative embodiment of a radially deployable fluted supportive device 20, where end flutes are mounted on sticks or handles 27 which turn about the same pivot point. As such, when in operative form the supportive device 20 radiates from the center and assumes the figure of a section of a circle.

FIGS. 12 to 15 illustrates a further alternative of a radially deployable fluted supportive device 20 supported on a bookfold base 28 providing added support to the foundation. The book-fold base 28 enables the supportive device 20 to be convenient compacted for easy of storage. FIGS. 13 to 15 further includes triangular rigidifying folds 25 for added support and load-bearing characteristics.

It is to be understood that the radially deployable fluted supportive device 20 in this example may bear any geometric plan in the superior aspect.

In use, food is placed on the upper folded edges or the food contact areas 21 in a microwave oven. When in operative form, spaces are formed between adjacent angular folds to enable circulation of air beneath the food and escape of any moisture.

Example 4

FIGS. 16 to 27 illustrate supportive devices 20 that all share the common feature of laterally deployable flutes supported on a book-fold base 28 which provides added support for the food contact areas 21 and to enable compactability.

The supportive device 20 illustrated in FIGS. 16 to 18 is made from paper without the need for glue or a fastener. FIGS. 19 to 21 illustrate an embodiment where the ends 29 are glued together. FIGS. 22 to 24 illustrate a further embodiment where the ends 29 of laterally deployable flutes are glued to a backing base 31 made from cardboard or carton. In a still further embodiment, FIGS. 25 to 27 illustrate the use of a tab 30 and slot 32 arrangement for fastening or locking the ends 29 of the device together when in operative form.

In use, food 10 is placed on the upper food contact areas 21 in a microwave oven when the supportive device 20 is in a fully expanded operative form as illustrated in FIGS. 18, 21, 24 and 27. In operative form, spaces are formed between adjacent lateral parallel folds to enable circulation of air beneath the food and escape of any moisture.

Example 5

FIGS. 28 to 29 illustrate a still further embodiment of a laterally deploying fluted supportive device 20 in accordance with the invention. The size of the flutes increase in length from either side, with the central flute being the longest. Preferably, the ends of the flutes include triangular rigidifying folds 25 to provide further support to the foundation. Of course, the number, symmetry, length and size can be modified to suit the type of food 10 being heated or cooked.

Example 6

FIGS. 30 to 32 illustrate a self-deploying book-fold supportive device 20 in accordance the invention. This particular embodiment is formed by producing cut-outs 33 in the base 28. In operative form, when the book-fold base 28 is opened the cut-outs 33 pop out from the base 28 to form elevated food contact areas 21 interconnected to the base 28 via supports 22. The food contact areas 21 may also included bridging portions 34 to provide further support to the food when placed thereon.

In use, this embodiment supports food on the food contact areas 21 and if the weight of the food is excessive then the bridging portions 34 carry the slack. In operative form, spaces are formed between the contact areas 21, bridging portions 34 and the base 28 to enable circulation of air beneath the food and escape of any moisture.

Example 7

FIGS. 33 to 37 illustrate food supportive devices 20 in accordance with the invention made thin rigid material which is not compactable. The devices shown in these examples may be made from plastics, papier-mâché or similar material which is permanently formable. Though these particular embodiments are circular in plan, it is to be understood that the device 20 may bear any geometric plan in the superior aspect.

In FIGS. 33 to 36, food support members which are essentially analogous to the fluting described in previous examples have food contact areas 21 interconnected to a base 22 via interconnecting supports 23. The food contact areas 21 are arranged substantially in two concentric circles with spaced therebetween to allow for circulation of air and to allow for moisture to be expelled from the lower surface of food placed thereon.

FIG. 36 further illustrates the utilization of expander ring 35 which may be used to increase the size of food supportive device 20 to enable larger food items, such as pizzas, to be heated or cooked in a microwave oven. The smaller supportive device 20 fits into the middle of the expander ring 35 which also includes food contact areas 20 to provide for a larger food supportive device 20 in accordance with the invention.

FIG. 37 illustrated another embodiment of a rigid type of food supportive device 20 in accordance with the invention. This embodiment includes a base 22 have a plurality of rounded supports members 36 providing for spaces between the food contact areas 21 and the base 22.

Example 8

Packaging 37 including food supportive devices 20 and a lid 38 in accordance with the invention are illustrated in FIGS. 38 and 39. A cavity is formed between lid 38 and supportive device 20 to hold food to be heated or cooked. The lid 38 and the supportive device 20 include complementary ridge 39 and groove 40 arrangement to provide for an air-tight seal. The packaging 37 illustrated in FIG. 38 may be suitable for pastries, such as a pie and the packaging 37 illustrated in FIG. 39 may be suitable for pizzas.

In use, food is enclosed within the package 37. After the user purchases the food item, they will be able to heat the food item in a microwave oven on demand. They simply remove the lid 38 and place the food item 10 and supportive device 20 into the microwave oven for heating. After heating, the packaging 37 may simply be discarded. Suitably, the packaging is made from PET which is recyclable.

Example 9

FIGS. 40 to 42 illustrate different retail industries that could directly benefit from the present invention. FIG. 40 shows a process where pastries are baked, cooled and then packed in packaging including the supportive device 20 of the invention. The packaged pastries are then delivered to the supermarket for retail. A customer can then purchase the pastries to have on hand, so that they can quickly and conveniently heat the pastries on the supportive device 20 on demand.

Traditionally pastries purchased in the retail environment are recommended to heated in a conventional oven to prevent sogginess. This could take over 30 minutes by the time they pre-heat the oven. However by utilizing the present invention, the pastry may be heated in a microwave oven in around two minutes producing a product that is equal in quality as if it had been baked.

These advantages can also be transferred to the takeaway industry as indicated in FIGS. 41 and 42. In the pizza industry, the pizza bases could be baked, cooled and delivered to a take-away outlet. The process simply requires adding toppings and cooking in a microwave oven on a supportive device 20 of the invention. A quality pizza could be available in under two minutes, which is certainly a time and energy saver when compared to traditional oven cooking process.

Similarly, pastries could be made and stored in a fridge at a take-away until purchased when they can be quickly heated in a microwave oven in about two minutes on the supportive device of the invention. As such the customer receives a freshly heated pastry and not a pastry that has been sitting in a heating box all day. This may also prevent wastage as the pastries only need be heated upon demand.

Example 10

As this invention relates to preventing moisture absorption in food during microwaving, it may be useful in drying processes where it is required that any moisture build up in food is removed. This is especially applicable to deep-frying processing where any moisture in food can be detrimental to the end product and may prevent a product from becoming crispy. These food types may include potato chips, corn chips, tortillas and the like. Instead of the traditional process of drying out such foods items in thermal ovens, it may be quicker and more cost effective to utilize the invention to dry out the food. Once dry, the food can then be deep-fried in the normal manner to provide quality food products.

It will of course be realized that while the foregoing has been given by way of illustrative example of this invention, all such and other modifications and variations thereto as would be apparent to persons skilled in the art are deemed to fall within the broad scope and ambit of this invention as is herein set forth.

The invention claimed is:

1. A microwave food supportive device used for microwave heating, cooking or drying of food including:

a plurality of food contact areas elevated from and substantially integral to a foundation that enables the support of food placed directly on the food contact areas, wherein spaces between the elevated contact areas and the foundation forms conduits adapted to vent the moisture from the food during microwaving, wherein the foundation and elevated food contact areas are formed by a fold-like arrangement, wherein the fold-like arrangement form a series of substantially triangular shaped concertina-like flutes, and wherein at least one end of each flute includes a triangular fold.

2. The device according to claim 1 wherein the flutes are arranged laterally.

3. The device according to claim 1 wherein the flutes are arranged radially.

4. A microwave food supportive device used for microwave heating, cooking or drying of food including:

a plurality of food contact areas elevated from and substantially integral to a foundation that enables the support of food placed directly on the food contact areas, wherein spaces between the elevated contact areas and the foundation forms conduits adapted to vent the moisture from the food during microwaving, wherein the foundation and elevated food contact areas are formed by a fold-like arrangement, wherein the fold-like arrangement form a series of substantially triangular shaped concertina-like flutes, wherein at least one end of each flute includes a triangular fold; and wherein the device is compactable.

5. The device according to claim 4 wherein the flutes are contacted to a foldable base, said flutes being compacted when the base is folded and are elevated when the base is unfolded.

6. The device according to claim 1 wherein the opposed ends of the flutes are attached to handles.

* * * * *